US011301080B2

(12) United States Patent
Beuker et al.

(10) Patent No.: US 11,301,080 B2
(45) Date of Patent: Apr. 12, 2022

(54) TECHNIQUES FOR ROUTING SIGNALS USING INACTIVE SENSOR REGIONS OF TOUCH SENSORS AND RELATED SYSTEMS AND DEVICES

(71) Applicant: ATMEL CORPORATION, Chandler, AZ (US)

(72) Inventors: Rob Ann Beuker, Southampton (GB); Mark Cheng, Keelung (TW); Yona Tsai, New Taipei (TW); Samuel Daniel Brunet, North Boarhunt (GB)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 16/948,270

(22) Filed: Sep. 10, 2020

(65) Prior Publication Data

US 2021/0096721 A1   Apr. 1, 2021

Related U.S. Application Data

(60) Provisional application No. 62/907,247, filed on Sep. 27, 2019.

(51) Int. Cl.
*G06F 3/041* (2006.01)
(52) U.S. Cl.
CPC .................. *G06F 3/04164* (2019.05)
(58) Field of Classification Search
CPC .................................... G06F 3/04164
USPC ......................................... 345/173
See application file for complete search history.

(56) References Cited

U.S. PATENT DOCUMENTS

| 8,810,543 | B1 | 8/2014 | Kurikawa |
| 9,619,088 | B2 | 4/2017 | Azumi et al. |
| 9,804,704 | B2 | 10/2017 | Azumi et al. |
| 9,811,231 | B2 | 11/2017 | Huang et al. |
| 2013/0015906 | A1 | 1/2013 | Yeh |
| 2013/0155000 | A1 | 6/2013 | Trend et al. |
| 2013/0241874 | A1* | 9/2013 | Long ............. G06F 3/04166 345/174 |
| 2013/0265279 | A1 | 10/2013 | Park et al. |
| 2013/0265282 | A1 | 10/2013 | Nakagawa et al. |
| 2015/0116256 | A1 | 4/2015 | Hsu et al. |
| 2015/0185914 | A1 | 7/2015 | Han et al. |
| 2015/0242022 | A1 | 8/2015 | Hung et al. |
| 2016/0093685 | A1 | 3/2016 | Kwon et al. |

(Continued)

FOREIGN PATENT DOCUMENTS

| CN | 103488332 A | 1/2014 |
| KR | 2015-0080245 A | 12/2016 |
| WO | 2015/164056 A1 | 10/2015 |

OTHER PUBLICATIONS

Outgoing—ISA/210—International Search Report dated Oct. 9, 2019 for WO Application No. PCT/US19/039901.

(Continued)

*Primary Examiner* — Mark Edwards
(74) *Attorney, Agent, or Firm* — TraskBritt

(57) ABSTRACT

A sensor region of a touch sensor may include active and inactive sensor regions. The inactive sensor regions may include one or more routing connectors electrically connected to the active sensor regions, electrically connected to connection forming elements, and/or electrically connected to tracking lines. System and touch displays may include touch sensors with such sensor regions.

16 Claims, 14 Drawing Sheets

(56) References Cited

U.S. PATENT DOCUMENTS

| | | | |
|---|---|---|---|
| 2017/0255287 A1 | 9/2017 | Huang et al. | |
| 2017/0308202 A1* | 10/2017 | Fang | G06F 3/0416 |
| 2019/0042018 A1* | 2/2019 | Kim | G06K 9/00087 |
| 2019/0302944 A1* | 10/2019 | Rhe | G06F 3/0412 |
| 2020/0004359 A1 | 1/2020 | Dubery et al. | |
| 2020/0285330 A1* | 9/2020 | Xu | G06F 3/0443 |

OTHER PUBLICATIONS

Outgoing Written Opinion of the ISA dated Oct. 9, 2019 for WO Application No. PCT/US19/039901.

U.S. Appl. No. 62/907,247, filed Sep. 27, 2019, titled "Using Inactive Regions of Touch Sensors for Routing Signals, and Related Systems and Devices", to Beuker et al., 31 pages.

International Search Report from International Application No. PCT/US2020/070560, dated Jan. 12, 2021, 5 pages.

International Written Opinion from International Application No. PCT/US2020/070560, dated Jan. 12, 2021, 8 pages.

\* cited by examiner (State Of The Art)

TECHNIQUES FOR ROUTING SIGNALS USING INACTIVE SENSOR REGIONS OF TOUCH SENSORS AND RELATED SYSTEMS AND DEVICES

CROSS-REFERENCE TO RELATED APPLICATION

This application claims the benefit of the priority date of U.S. Provisional Patent Application No. 62/907,247, filed Sep. 27, 2019, and titled "USING INACTIVE REGIONS OF TOUCH SENSORS FOR ROUTING SIGNALS, AND RELATED SYSTEMS AND DEVICES," the contents and disclosure of which is incorporated herein in its entirety by this reference.

FIELD

This disclosure relates, generally, to capacitive sensors and capacitive sensing systems including the same. More specifically, this disclosure relates to capacitive touch sensors and capacitive touch sensing systems which may have better charge and/or response times and enable use of smaller external borders (e.g., bezels).

BACKGROUND

Touch sensors, which may be characterized as a transparent conductive layer on top of a display that can detect/respond to a touch (e.g., a smart phone, tablet, appliance interface, or the like), are typically arranged in a row/column grid of conductors (e.g., electrically-isolated lines of conductive material) that may be represented as an n by m matrix. Generally, these conductors may be referred to as sensor lines, and may also be characterized as sense lines or drive lines. Each touch sensor may include a number of connectors on each axis where the rows of lines and columns of lines terminate. Such connectors are externally accessible (e.g., by way of pins) and may be, for example, operatively coupled to a touch controller that includes acquisition circuitry and processing circuitry configured to determine information about touches detected at a touch sensor.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
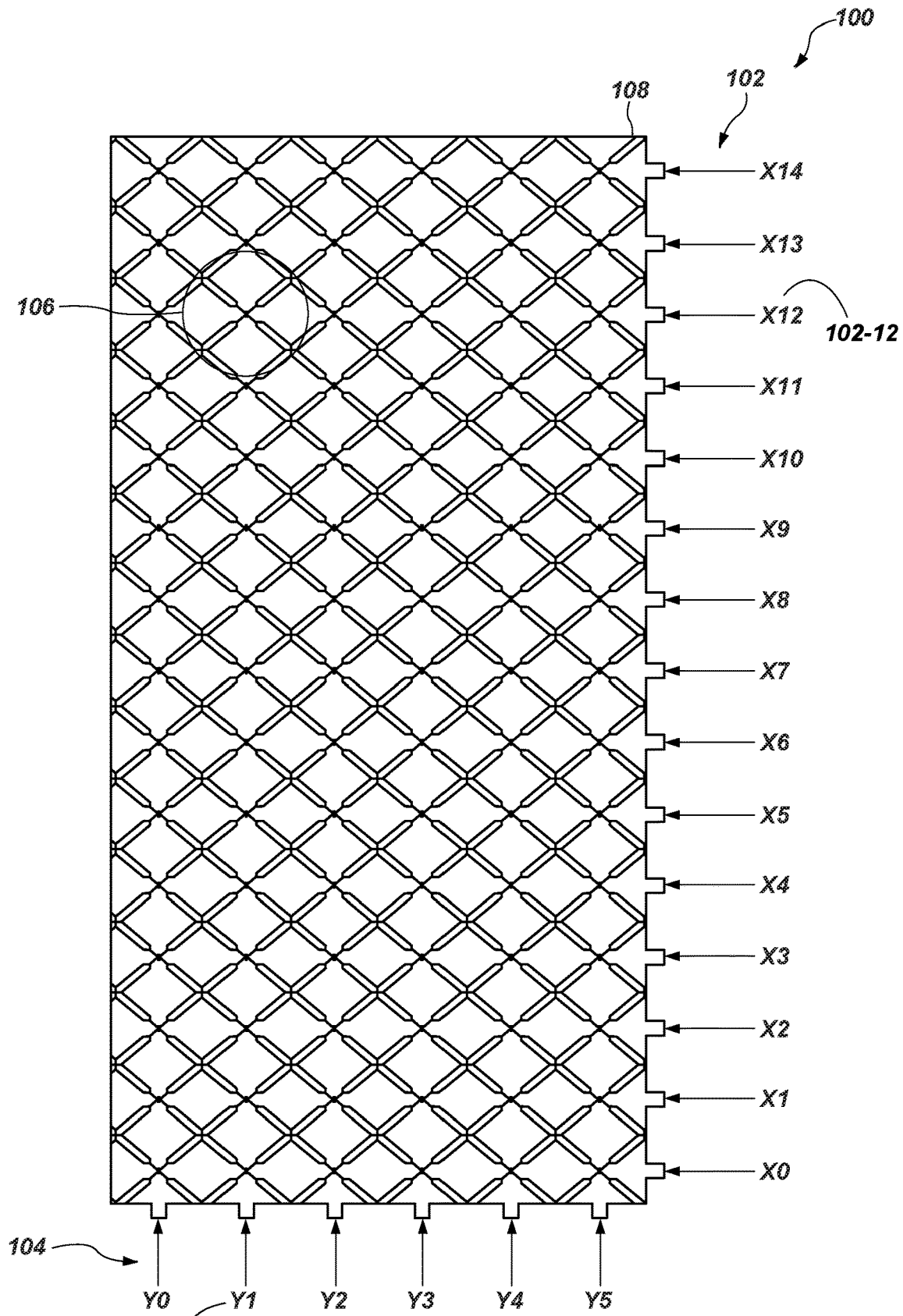
FIG. 1 illustrates a schematic of an active sensor region of a touch sensor in accordance with one or more embodiments.

In one or more embodiments, charge and/or response times may be reduced because the electrical current sent to, and the signals generated by, the active sensor region(s) may have a shorter distance to travel when compared to routing techniques relying on sending such current and/or signals to a lateral periphery of a touch sensor and then routed via tracking lines around a periphery of a touch sensor to a touch controller. Moreover, a size of any external borders (e.g., bezels) covering the periphery of the capacitive touch sensor and/or capacitive touch sensing systems may be reduced because the borders may not need to cover as many routing members for the signals generated by the active sensor region(s).

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe illustrative embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary,"

"by example," and "for example," means that the related description is explanatory, and though the scope of the disclosure is intended to encompass the examples and legal equivalents, the use of such terms is not intended to limit the scope of embodiments or this disclosure to the specified components, steps, features, functions, or the like.

Thus, specific implementations shown and described are only non-limiting examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general□purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Embodiments may be described herein in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, when an element is referred to as being "on," "connected to," "coupled to," or "coupled with" another element, it can be directly on, connected, or coupled with the other element or intervening elements may be present. In contrast, when an element is referred to as being "directly on," "directly connected to" or "directly coupled with" another element, there are no intervening elements or layers present. It will be understood that when an element is referred to as "connecting" or "coupling" a first element and a second element then it is connected to the first element and it is connected to the second element.

As used herein, when an element is referred to as being "electrically connected to" another element, then charge and/or signals can be transferred between the element and the other element, directly or via intervening elements if any are present. In contrast, when an element is referred to as being "directly electrically connected to" another element, there are no intervening elements or layers present. It will be understood that when an element is referred to as "electrically connecting" a first element and a second element, then charge and/or signals can move between the first element and the second element via the element, including via intervening elements if any are present. It will be understood that the terms "electrically connected to" and "electrically connecting" do not require actual charge or signals to be transferred.

As used herein, the term "line" means a path for carrying electrical charge and signals, and may include one or more instances of a wire, a circuit, and portions thereof.

As used herein, a reference to a "periphery" of an area includes a boundary (or portion thereof) of the area, and may also include regions just inside the boundary, and regions just outside the boundary where the context in which the term is used so directs.

As understood for purposes of the embodiments described in this disclosure, a capacitive sensor (which may also be referred to herein as a "touch sensor") may respond to an object's (such as a finger, stylus, or other detectable object, without limitation) contact with, or the object's proximity to, a contact-sensitive area of the capacitive sensor. In this disclosure, "contact" and "touch" are meant to encompass both an object's physical contact with a contact-sensitive area and an object's presence within proximity of a contact-sensitive area without physical contact. Actual physical contact with a capacitive sensor is not necessarily required.

When an object contacts a capacitive sensor, a change in capacitance may occur within the capacitive sensor at or near the location of the contact. An analog acquisition front-end may detect the contact if it meets a certain threshold. "Charge-then-transfer" is a nonlimiting example of a technique implemented in some touch-acquisition front-ends for detecting capacitive changes, whereby a sensing capacitor is charged responsive to a change in capacitance (e.g., charged faster or slower) and a charge is transferred to an integrating capacitor over multiple charge-transfer cycles. An amount of charge associated with such a charge-transfer may be converted to digital signals by an analog-to-digital converter (ADC), and a digital controller may process those digital signals (typically referred to as "delta counts" or just "deltas") to determine measurements and/or detect if an object contacted a sensor.

Self-capacitance sensors (also referred to herein as "self-cap sensors") are capacitive field sensors that respond to changes in capacitance to ground. They are typically laid out in an array of rows and columns that react independently to a touch. By way of nonlimiting example, a self-cap sensor may include a circuit employing repetitive charge-then-transfer cycles using common integrated CMOS push-pull driver circuitry having floating terminals.

Mutual capacitance sensors are capacitive field sensors that respond to changes in capacitance between two electrodes: a drive electrode and a sense electrode. The drive electrode and sense electrode pairs at each intersection of drive lines (also more generally characterized herein as "transmitter lines") and sense lines (also more generally characterized herein as "receiver lines") form a capacitor. Such a pair of a drive electrode and a sense electrode may be referred to herein as an "active sensor node."

Self-capacitance and mutual capacitance techniques may be used in the same touch interface system, and complimentary to each other, for example, self-capacitance may be used to confirm a touch detected using mutual capacitance.

As an example, touch sensors may be overlaid (e.g., a touch pad or touch display, without limitation) in a 2-dimensional (2-D) arrangement (i.e., a 2-D touch sensor) for a 2-D contact sensitive surface and may facilitate user interaction with an associated device or appliance. Insulating protective layers (e.g., resins, glass, and/or plastic, without limitation) may be used to cover touch sensors and may be referred to herein as an "overlay." Such a 2-dimensional arrangement with or without an overlay may be referred to as a "touch screen." A "touch display" is a display (such as a liquid crystal display (LCD), thin-film-transistor (TFT) LCD, or a light emitting diode (LED) display) that incorporates 2-D touch sensors, as a nonlimiting example, implemented in a transparent medium over the display, sometimes with an additional transparent medium such as glass in front of the touch sensors.

Using a nonlimiting example of a touch sensor that uses a matrix sensor approach of mutual capacitance sensors employing charge-transfer techniques, drive electrodes may extend in rows on one side of a substrate and sense electrodes may extend in columns on the other side (e.g., opposing side, without limitation) of the substrate so as to define a "matrix" array of N by M active sensor nodes. Each active sensor node corresponds to an intersection between the electrically conductive lines of a drive electrode and of a sense electrode. A drive electrode simultaneously drives all of the active sensor nodes in a given row and a sense electrode senses all of the active sensor nodes in a given column. The capacitive coupling of the drive electrode and sense electrode (mutual capacitance), or the coupling of a sense electrode and ground (self-capacitance), at an active sensor node position may be separately measured or both measured in response to a capacitive change indicative of a touch event. For example, if a drive signal is applied to the drive electrode of row 2 and a sense electrode of column 3 is active then the node position is: row 2, column 3. Active sensor nodes may be scanned by sequencing through different combinations of drive and sense electrodes. In one mode the drive electrodes may be driven sequentially while the sense electrodes are all continuously monitored. In another mode the sense electrodes may be sampled sequentially.

Using a nonlimiting example of a touch screen that uses a matrix sensor approach of self-capacitance sensors, electrodes may extend in rows and columns to define a "matrix" array of N by M active sensor nodes. The matrix of sensors may be constructed with an electrode at each active sensor node, each electrode being individually addressable, or each row and column may be an addressable electrode and each active sensor node corresponds to a unique row/column pair. A drive signal (i.e., a time varying stimulus having an arbitrary waveform that includes one or more of a square wave, a rectangular wave, a triangular wave, and a sinusoidal wave, without limitation) is repeatedly provided to the electrodes of the sensor. When an object contacts the sensor, coupling between the object and the electrodes increases the current drawn on the electrodes which increases the apparent sensor capacitance, and this increase in sensor capacitance may be detected. For example, if an increase in capacitance is detected while a drive signal is applied to electrode row 2 and electrode column 3, then the location of a touch may be row 2, column 3. Interpolation techniques may be used to identify locations between active sensor nodes. Active sensor nodes may be scanned sequentially by sequencing through combinations of rows and columns of electrodes.

As nonlimiting examples, microcontrollers, digital logic circuits, and configurable state machines may be configured to perform functions of acquisition circuitry and touch controllers described herein, such as controlling drive electrodes, monitoring sense electrodes, analyzing capacitive effects (e.g., detected from measured changes in channel capacitance and/or absolute channel capacitance, without limitation) on a touch sensor, and processing and reporting touches more generally, without limitation.

Integrated Circuit (IC) packages that include a microcontroller may provide input and output pins to communicate with a host; as well as the firmware to perform techniques and operations, including those described herein in connection with various embodiments.

In capacitive touch systems, there is a desire (i.e., advantages appreciated by the inventors of this disclosure) to minimize the time to charge a sensor after a drive pulse changes voltage (referred to herein as a "charge time"). As a nonlimiting example, the report rate of a capacitive touch system will decrease (i.e., fewer reports per time interval) as charge time increases. For some applications/uses, report rates are expected to be above a certain threshold (e.g., 100 times per second, without limitation). As another nonlimiting example, noise is coupled into a touch measurement during the charge time, the longer the charge time the more opportunity for noise to be coupled into a touch measurement.

Various aspects of capacitive sensor design may contribute to charge time, including, without limitation, a resistance, denoted Rx, between an output of a touch controller and an active sensor node (referred to herein a "line resistance"), and a capacitive loading of a touch sensor (e.g., capacitive loading between a line and a display, without limitation).

Ignoring connector elements (e.g., tracking lines, without limitation), for a single-connected drive line the maximum resistance Rx would be equal to the total resistance of a drive line. For a double connected drive line arrangement of a resistance reducing connection, the resistance Rx is lower, in theory as little as one quarter of a single-connected Rx arrangement $$\left(\text{i.e., } R(\text{single}-\text{connected}) \div 2 \div 2 = \frac{R}{4}\right).$$

So, in theory, a worst case resistance Rx of a double-connected sensor could be a quarter of a worst-case resistance of a single-connected sensor.

One approach to manage charge time is to use a resistance reducing connection such as to double-connect a sensor matrix, without limitation, that is, connect a sensor line (drive line or sense line) at both ends (e.g., left end and right end for rows, or top end and bottom end for columns) to a touch controller input.

In touch displays, the touch sensor is typically placed on top of the display in order to allow users to "touch" displayed interface elements such as buttons and sliders, without limitation, and/or to directly manipulate displayed content such as a map, without limitation.

As used herein, the terms "drive line" and "sense line" may be used interchangeably with the terms "drive electrode" and "sense electrode." Collectively, drive electrodes and sense electrodes may be referred to herein as "touch electrodes." Collectively, drive lines and sense lines may be referred to herein as "sensor lines." "Sensor line" should be understood to encompass a drive line and a sense line unless the context in which it is used directs otherwise.

In a typical touch display a touch sensor covers an entire displaying surface of a display. To avoid obstructing or degrading a user's view of the displaying surface, electrodes of a touch sensor typically are formed using a material that is practically transparent (i.e., nearly or entirely undetectable by the human eye). As a nonlimiting example, transparent electrodes may be formed of a conductive material such as Indium Tin Oxide (ITO) or a transparent conductive polymer. Optical transmittivity in the order of 98% to 99% may be achievable, as a nonlimiting example, depending on a thickness of the ITO layer. A thicker ITO layer reduces line resistance, however, at the cost of lower optical transmittivity. Notably, the resistance of ITO is typically large in comparison to metals such as copper or silver.

If an active sensor region (e.g., including a plurality of active areas) of a touch sensor does not entirely cover a display, the remaining region (or remaining areas), if any, of a touch sensor may be formed of "dumb" sensor nodes that are not electrically connected and are unresponsive to contact. Such a remaining region may be referred to herein as an "inactive sensor region." The pattern for dumb nodes may be the same pattern as the pattern used in an active touch sensor region, but that is not required.

Some embodiments relate, generally, to one or more sensor regions of a capacitive touch sensor. The sensor region may also include one or more active sensor regions and one or more inactive sensor regions. Each active sensor region may include one or more active sensor nodes. Each inactive sensor region may include one or more inactive sensor nodes. Active sensor nodes and inactive sensor nodes of a given sensor region may be collectively referred to herein as "sensor nodes."

In some embodiments, one or more sensor regions of a capacitive touch sensor may include first electrical conductors arranged in a first direction; and second electrical conductors arranged in a second direction, the second direction transverse to the first direction. An active sensor node of the sensor region may include two electrically connected first electrical conductors and two electrically connected second electrical conductors. An inactive sensor node of the sensor region may include a group of electrically connected electrical conductors, the group of electrically connected electrical conductors comprising one and only one of: (i) at least two electrically connected first electrical conductors, or (ii) at least two electrically connected second electrical conductors.

FIG. 1 is a schematic diagram of an active sensor region 100 of a sensor region of a touch sensor (also referred to herein as a "touch sensor region"), in accordance with one or more embodiments. In the specific example depicted by FIG. 1, drive lines respectively including a number of electrically conductive conductors (also referred to herein as "electrical conductors" or just "conductors"), e.g., X lines 102, are arranged in rows, and sense lines of electrical conductors, e.g., Y lines 104, are arranged in columns. X lines 102 and the Y lines 104 are supported on a surface of support structure 108 of active sensor region 100, such as a substrate, a display, a material coating a display, without limitation. In some embodiments, active sensor region 100 of FIG. 1 may be configured as a single-layer active sensor region 100, including X lines 102 and Y lines 104 arranged in a same layer as one another, supported by a support structure 108. In other embodiments, active sensor region 100 may be configured as a multi-layer active sensor region 100 (e.g., dual layer, without limitation), including X lines 102 and Y lines 104 respectively arranged in different layers from one another (e.g., in layers in different parallel planes, without limitation), the different layers supported by support structure 108.

Each of the X lines 102 or Y lines 104 may be formed from lines of contiguous electrical conductors—stated another way, continuously electrically connected electrical conductors. These electrical conductors may be formed of electrically conductive material defining one or more areas.

Each such area may form a shape, such as a disc, square, rectangle, parallelogram, diamond, rhombus, thin line other suitable shape, or suitable combination of these, without limitation. One or more cuts in the electrically conductive material that form one or more layers may (at least in part) may create the shape of the area, and the area may (at least in part) be bounded by spaces. Non-electrically conductive material may be used as infill in spaces formed by the cuts in the electrically conductive material or that may be generally defined the shaped areas.

Non-limiting examples of electrically conductive material include indium, gold, aluminum, copper, tin, alloys, ceramics, and combinations of these. A non-limiting example of an alloy is indium tin oxide (ITO). In some embodiments the electrically conductive material may occupy approximately 100% of the area of its shape (sometimes referred to as 100% fill).

In other embodiments, the conductive material may occupy substantially less than 100% of the area of its shape. As a non-limiting example, an area may be formed from ITO and fine lines of metal or other conductive material (commonly referred to as "FLM" or "mesh") are used to "cover" the area, such as for example copper, silver, or a copper- or silver-based material. As a non-limiting example, the fine lines of conductive material may occupy approximately 5% of the area of its shape in a hatched, mesh, or other suitable pattern. Although this disclosure describes or illustrates particular lines of electrical conductors comprising particular electrically conductive material forming specific shapes with specific fills having specific patterns, suitable lines of electrical conductors of any suitable electrically conductive material forming any suitable shapes with any suitable fill percentages having any suitable patterns are encompassed by this disclosure including legal equivalents thereof.

In the specific example of active sensor region 100 depicted by FIG. 1, contiguous electrical conductors are formed of, as non-limiting examples, repeating patterns of generally diamond-shaped electrically conductive material (such electrical conductors of FIG. 1 may be referred to herein as a "diamond-shaped conductor").

As depicted by FIG. 1, each such diamond-shaped conductor that forms the X lines 102 or the Y lines 104 is electrically connected to one another at corners of the diamond shaped conductor. Electrical conductors of a given X line 102 are connected at adjacent lateral corners of the diamond shapes and electrical conductors of a given Y line 104 connected at adjacent longitudinal corners of the diamond shapes—when active sensor region 100 is oriented as depicted by FIG. 1.

As discussed above, in a touch sensor configuration of active sensor region 100, intersections of X lines 102 and Y lines 104 is an active sensor node of active sensor region 100, and in a contemplated operation, a node location may be determined by an electrical field that is projected from an X line to a Y line. An active sensor node of active sensor region 100 may encompass at least portions of multiple diamond-shaped conductors that are covered by an electrical field projected from a drive line to a sense line.

Active sensor region(s) are areas of a sensor region that include one or more active sensor nodes, and by way of more specific example, that include an intersection of a first group of electrically connected electrical conductors arranged in a first direction (e.g., a Y, longitudinal, or vertical direction, without limitation) and a second group of electrically connected electrical conductors arranged in a second direction, the second direction being a transverse direction relative to the first direction (e.g., an X, lateral, or horizontal direction, without limitation). The first group of electrically connected electrical conductors arranged in the first direction are electrically connected in series and the second group of electrically connected electrical conductors arranged in the second direction are electrically connected in series, and electrically isolated from the first group of electrically connected electrical conductors.

Inactive sensor regions are areas of a sensor region that do not include active sensor nodes. As discussed in connection with one or more embodiments, an inactive sensor region may include one or more inactive sensor nodes. An inactive sensor node does not include an intersection of a first line of electrically connected electrical conductors and a second line of electrically connected electrical conductors, though as the term is used herein it may include a line that includes a number of continuously electrically connected electrical conductors—but not two lines intersecting.

Figure 2A:
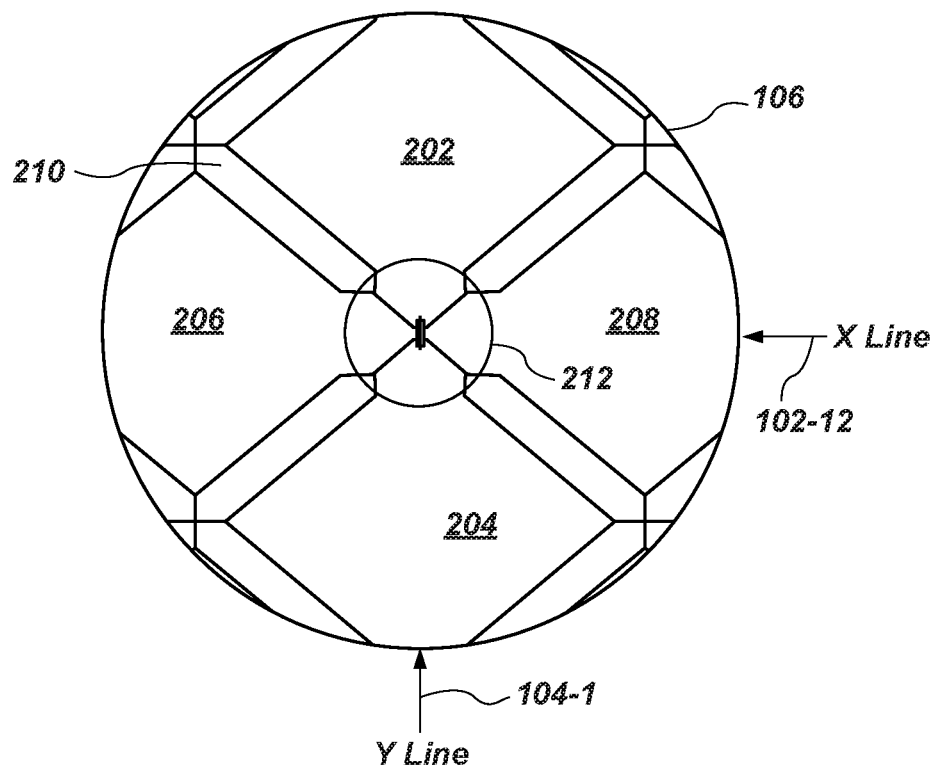
FIGS. 2A and 2B illustrate schematics of two enlarged views of a node of the active sensor region of the touch sensor of FIG. 1 at varying levels of magnification.
Figure 2B:
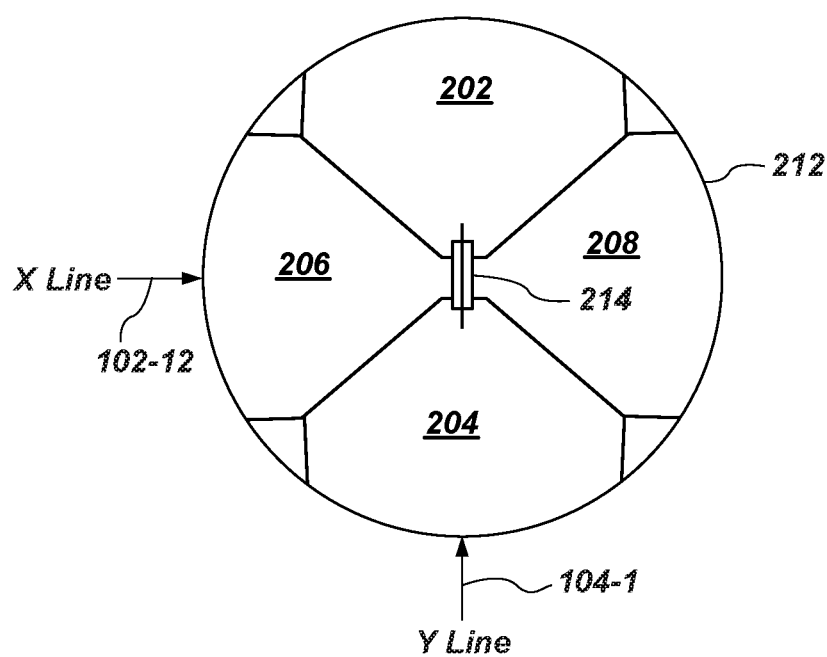

FIG. 2A and FIG. 2B depict enlarged views of a sensor node 106 of active sensor region 100 of FIG. 1 at varying levels of magnification. A view depicted by FIG. 2A corresponding to an encircled portion of FIG. 1 is of sensor node 106, and more specifically, of a portion of a first line 102-12 of electrically connected electrical conductors (corresponding to drive line X12 in FIG. 1) and a portion of a second line 104-1, transverse to first line 102-12, of electrically connected electrical conductors (corresponding to sense line Y1 in FIG. 1). FIG. 2A further depicts longitudinally adjacent electrically connected diamond-shaped areas of electrical conductors, namely, first Y conductor 202 and second Y conductor 204, that form a portion of second line 104-1. FIG. 2A further depicts laterally adjacent electrically connected diamond-shaped areas of electrical conductors, first X conductor 206 and second X conductor 208, that form a portion of first line 102-12. The diamond-shaped conductors 202, 204, 206 and 208 may, as a group, be understood to roughly correspond to an active sensor region or a portion thereof.

In some embodiments, electrically isolating material may be located between adjacent electrical conductors. In the specific example depicted by FIG. 2A, infill 210 is located in a portion of border regions between adjacent conductors 202/206, 202/208, 206/204, and 208/204. As a non-limiting example, the infill 210 may include a dielectric material forming a repeating pattern of cross shapes (e.g., X-shaped regions) electrically isolating at least portions of the diamond-shaped areas of electrically conductive material of conductors of X lines 102 and the Y lines 104 from one another.

FIG. 2B depicts a view of an encircled portion of sensor node 106 depicted by FIG. 2A. FIG. 2B depicts an area of intersection 212 between first line 102-12 and second line 104-1. First X conductor 206 is electrically connected to second X conductor 208 by, as a non-limiting example, a continuous extension of the electrically conductive material of first X conductor 206 and/or second X conductor 208 extending laterally between the two conductors. The first Y conductor 202 is electrically connected to the second Y conductor 204 by a conductive bridge 214 (e.g., an ITO or a metal cross over, without limitation) extending over, and electrically-isolated from, the continuous extension of the electrically conductive material electrically connecting first X conductor 206 and second X conductor 208.

Figure 3:
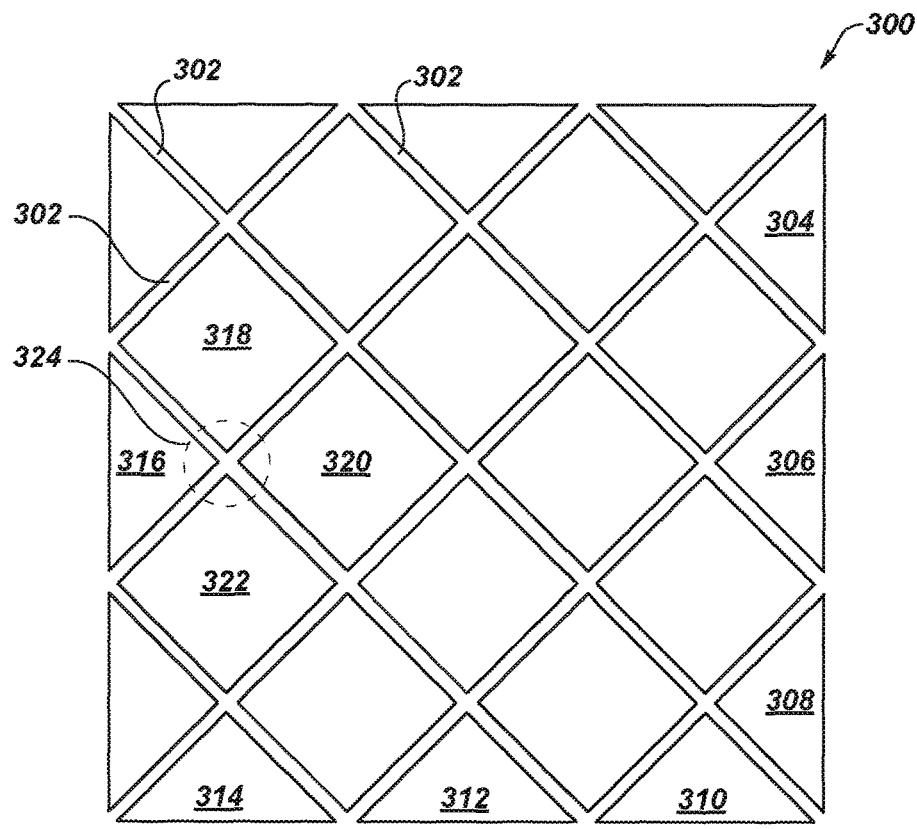
FIG. 3 illustrates a schematic of an inactive sensor region of a touch sensor in accordance with one or more embodiments.

FIG. 3 is a schematic diagram of a portion of an inactive sensor region 300 of a touch sensor, in accordance with one or more embodiments. Inactive sensor region 300 may include a number of inactive sensor nodes that are completely or partially electrically-isolated from other inactive sensor nodes of inactive sensor region 300, and one or more of which may collectively form a number of inactive sensor regions including without limitation inactive sensor region 300.

To completely electrically isolate inactive sensor nodes of an inactive sensor region, including without limitation inactive sensor region 300, conductors of inactive sensor nodes may be electrically-isolated from all other conductors by gaps or spaces formed at border regions 302 (such gaps or spaces formed by cuts made in conductive material, without limitation) between each electrically-isolated electrical conductor. In some embodiments, such border regions 302 between electrical conductors of inactive sensor nodes may be filled with a passive material such as a dielectric material, without limitation.

In the specific example depicted by FIG. 3, conductors 316, 318, 320 and 322 form an inactive sensor node substantially at intersection 324 (i.e., an intersection point of a first imaginary geometrical line drawn through a center point of first conductor 316 and second conductor 320 and a second imaginary geometrical line drawn through a center point of third conductor 318 and fourth conductor 322). During operation of a touch sensor including inactive sensor region 300, no capacitive electrical connections are formed at intersection 324.

In the specific example depicted by FIG. 3, conductors 318, 320 and 322 are completely electrically-isolated from adjacent conductors. Conductors 304, 306, 308, 310, 312, 314 and 316 located along a periphery of inactive sensor region 300 may be completely or partially electrically-isolated from other adjacent conductors. By way of a partially electrically-isolated example, one or more of conductors 304, 306, 308, 310, 312, 314 and 316 may be adjacent to and electrically-isolated from other conductors of inactive sensor region 300, and adjacent and electrically connected to a conductor (not shown) other than a conductor of inactive sensor region 300. By way of non-limiting example, such a conductor may be part of another inactive sensor region (not shown) or an active sensor region (not shown).

To partially electrically isolate inactive sensor nodes of an inactive sensor region, conductors of an inactive sensor node may be electrically-isolated (as discussed above) from laterally adjacent conductors or longitudinally adjacent conductors, but not both. Correspondingly, conductors of an inactive sensor node may be electrically connected (e.g., via a bridge connector or extending portion of conductive material, without limitation) to a laterally adjacent conductor or a longitudinally adjacent conductor, but not both.

Figure 4:
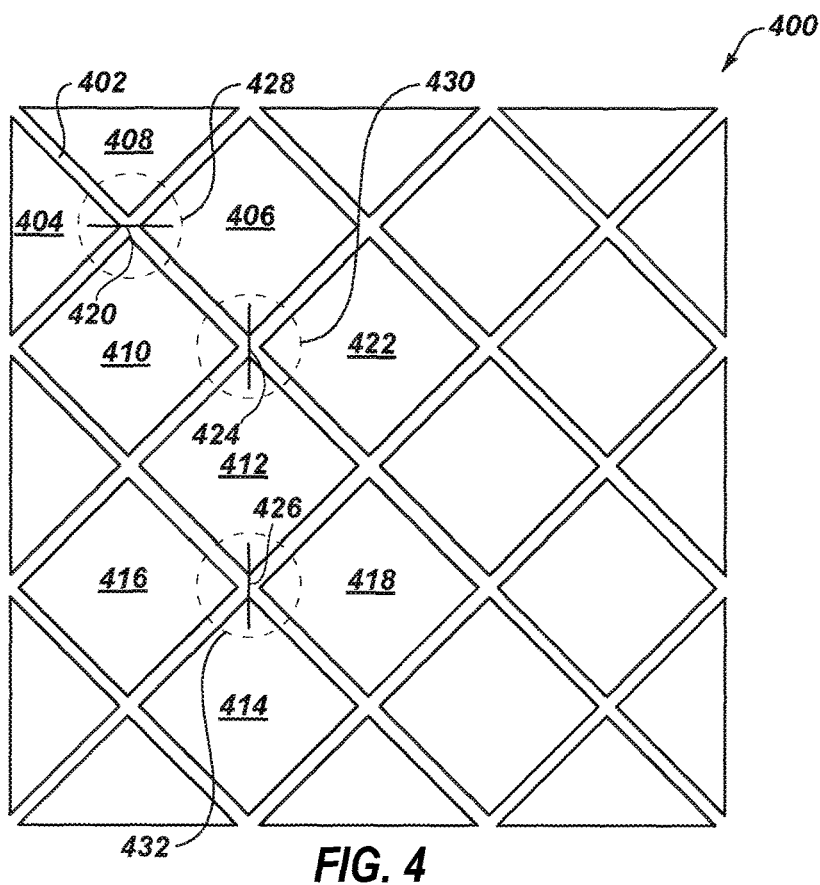
FIG. 4 illustrates a schematic of an inactive sensor region of a touch sensor that includes electrically connected inactive sensor nodes, in accordance with one or more embodiments.

FIG. 4 is a schematic diagram of a portion of an inactive sensor region 400 of a touch sensor, in accordance with one or more embodiments. In the specific example depicted by FIG. 4, inactive sensor region 400 includes a number of inactive sensor nodes (which may collectively form a number of inactive sensor regions), some of which are partially electrically isolated from adjacent sensor nodes by electrically isolating gaps 402.

Inactive sensor node 428 includes electrically connected laterally adjacent conductors 404 and 406 electrically connected by first connector 420, and includes electrically-isolated longitudinally adjacent conductors 408 and 410. Inactive sensor node 430 includes electrically isolated laterally adjacent conductors 410 and 422 and includes electrically connected longitudinally adjacent conductors 406 and 412 electrically connected by second connector 424. Inactive sensor node 432 includes electrically isolated laterally adjacent conductors 416 and 418 and includes electrically connected longitudinally adjacent conductors 412 and 414 electrically connected by a third connector 426.

By way of non-limiting example, a line including a group of continuously electrically connected conductors that includes conductors 404, 406, 412 and 414 may form a portion of an X line (e.g., one of X lines 102, without limitation) or form portion of a Y line (e.g., one of Y lines 104, without limitation). As discussed herein, an X line and a Y line may correspond to an X line (e.g., a horizontally extending drive or sense line, without limitation) and a Y line (e.g., a vertically extending drive or sense line, without limitation), respectively, of a touch sensor.

In the specific example depicted by FIG. 4, a routing connector of inactive sensor region 400 includes inactive sensor nodes 428, 430 and 432, and more specifically includes electrically connected conductors 404 and 406, electrically connected conductors 406 and 412, and electrically connected conductors 412 and 414. In a routing connector, conductors 404, 406, 412, and 414 form a group of continuously electrically connected conductors.

In one or more embodiments, a routing connector may be for a drive line or a sense line, as the case may be. Each of first connector 420, second connector 424, and third connector 426 may be a bridge, a portion of conductive material (e.g., ITO material that was not cut or otherwise spaced, without limitation), and/or combinations thereof, without limitation. In a group of continuously electrically connected inactive sensor nodes within an inactive sensor region, such as the group including inactive sensor nodes 428, 430 and 432, each conductor carrying a signal in a given direction (e.g., X direction, Y direction, horizontal direction, vertical direction, lateral direction, longitudinal direction, without limitation) may only be electrically connected to adjacent conductors carrying the signal in the same direction, with the exception of a corner or edge conductor, such as conductor 406, electrically connected to adjacent conductors (here, conductor 404 and conductor 412) carrying the signal in transverse (e.g., perpendicular) directions.

In one or more embodiments of a touch sensor configuration, drive signals sent to, and/or sensed signals received from, an active sensor region (e.g., active sensor region 100 of FIG. 1, without limitation) may be routed through one or more inactive sensor nodes of an inactive sensor region, such as the inactive sensor region 400 of FIG. 4, from driving circuitry and/or to sensing circuitry. One or more sub-regions of a touch sensor region of a touch sensor that would otherwise be dormant, such as is the case with inactive sensor region 300 of FIG. 3, may be utilized to route signals to and/or from one or more active sensor regions (e.g., active sensor region 100 of FIG. 1, without limitation).

By way of non-limiting example, when compared to conventional signal routing techniques that rely on routing signals to a periphery of the touch sensor and/or associated display, routing signals through inactive sensor regions located laterally between the lateral peripheries of the touch sensor and/or associated display and/or located longitudinally between the longitudinal peripheries of the touch sensor and/or associated display may reduce charge time and reduce response time due to shortening the distance over which the signal travels. By way of further non-limiting example, when compared to conventional signal routing techniques, routing signals in accordance with this disclosure may, additionally or alternatively, reduce a size of borders (e.g., bezel) around a touch sensor and/or associated display because at least some signal carriers that would conventionally be located at a periphery of a touch sensor, i.e., within a bezel region, may instead be located within a touch sensor and/or associated display themselves.

Figure 5:
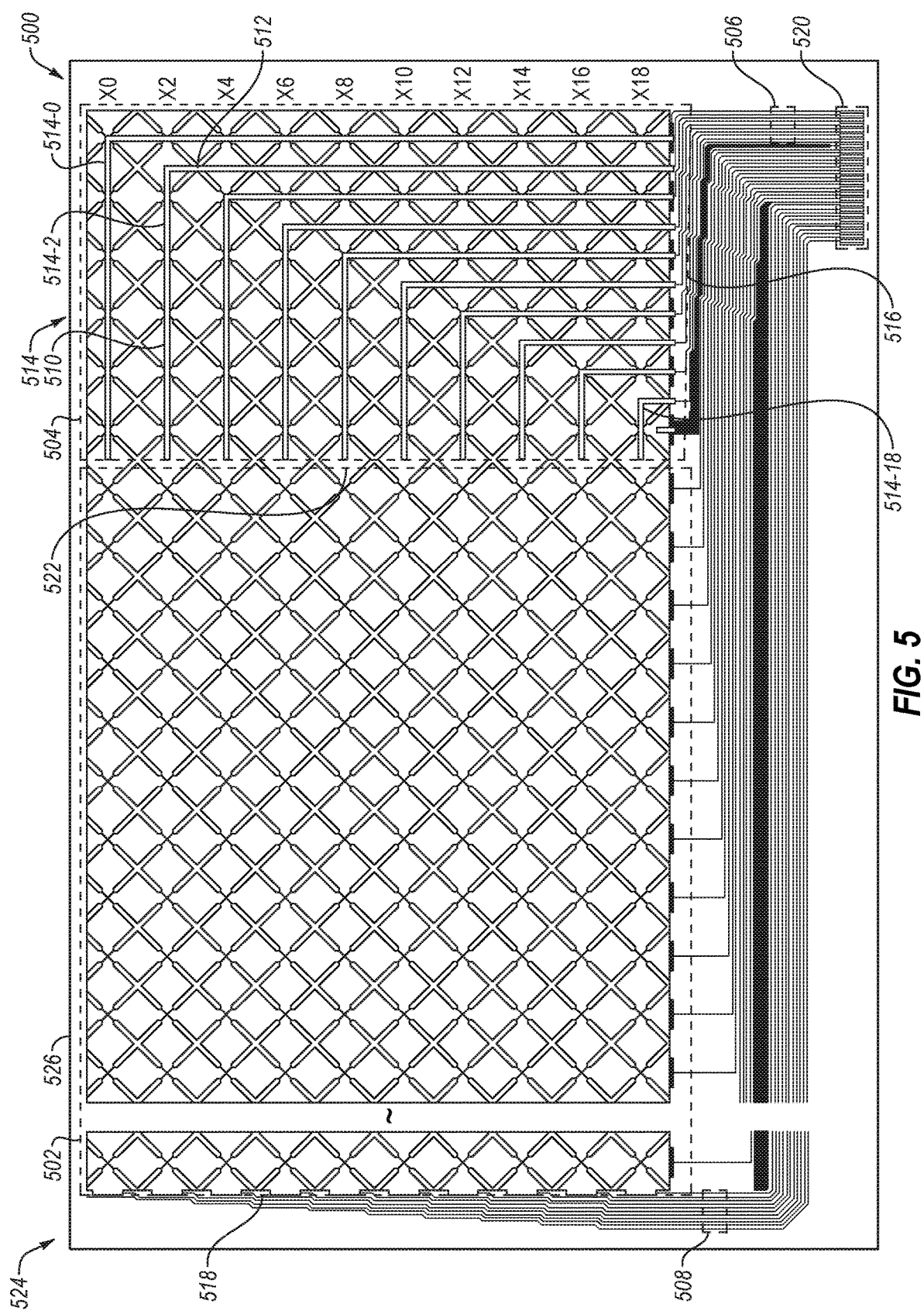
FIG. 5 illustrates a schematic of a region of a touch sensor including an inactive sensor region and at least one active sensor region in accordance with one or more embodiments.

FIG. 5 is a schematic diagram of a touch sensor 500 including a sensor region 524 formed on a support structure 526 (e.g., a semiconductor substrate, a printed circuit board, a transparent layer of a display, without limitation) configured to route signals to drive lines or from sense lines of an active sensor region 502 via an inactive sensor region 504, in accordance with one or more embodiments.

Touch sensor 500 includes routing connectors 514 of drive lines of active sensor region 502 of sensor region 524, the drive lines denoted in FIG. 5 as X0, X2, X4, X6 . . . X18. In the specific example depicted by FIG. 5, routing connector 514-0 is associated with drive line X0, routing connector 514-2 is associated with drive line X2, and so on such that routing connector 514-18 is associated with drive line X18. As discussed herein, routing connectors 514 may be formed from inactive sensor nodes of an inactive sensor region 504 of sensor region 524, here inactive sensor nodes of inactive sensor region 504.

More specifically, and as depicted by FIG. 5, inactive sensor region 504 includes routing connectors 514 configured to route signals (e.g., drive signals) to active sensor region 502. Notably, fewer than all conductors of inactive sensor region 504 are routing conductors, that is, some conductors have no electrical connections to adjacent conductors (e.g., as depicted by FIG. 3). In some embodiments some of the unused conductors depicted in FIG. 5 may be used for other signal routing, as a non-limiting example, signal routing from sense lines (not depicted by FIG. 5).

In the example depicted by FIG. 5, routing connectors 514 are configured to route signals through a substantially continuous extension in the same direction as the drive lines X0-X18 (e.g., via routing connector portion 510 of routing connector 514-2) and in a transverse direction (e.g., via routing connector portion 512 of routing connector 514-2) toward an outer periphery of touch sensor 500.

In some embodiments, tracking lines may electrically connect routing connectors (and by extension, drive lines) to connection forming elements for forming electrical connections external to touch sensor 500 (e.g., with a touch controller, without limitation).

Touch sensor 500 may include a number of connection forming elements 520 that are electrically connected to active sensor region 502 by tracking lines, including tracking lines 506 and 508. Routing connectors 514 are electrically connected to connection forming elements 520 by tracking lines 506, and the other ends of X sensor lines that correspond to (e.g., include, without limitation) routing connectors 514 are electrically connected to connection forming elements 520 by tracking lines 508. Connection forming elements 520 connected to Y sensor lines by tracking lines are depicted by FIG. 5 though not individually labeled.

A one-to-one correspondence of a number of tracking lines 506/408 and connection forming elements 520 is depicted by FIG. 5, but that is not required, and other arrangements including more or fewer tracking lines 506/508 than connection forming elements 520 are encompassed by this disclosure.

Individual tracking lines of tracking lines 506 and 508 and connection forming elements 520 are not specifically labeled in FIG. 5. For discussion purposes, it may be understood that a tracking line 506-0 electrically connects routing connector 514-0 to a connection forming element 520-0A, a tracking line 506-2 electrically connects routing connector 514-2 to a connection forming element 520-2A, and so on such that a tracking line 506-18 electrically connects routing connector 514-18 to a connection forming element 520-8A. Moreover, it may be understood that a tracking line 508-0 electrically connects a sensor line 0 (i.e., X0) to a connection forming element 520-0B, a tracking line 508-2 electrically connects a sensor line 2 (i.e., X2) to a connection forming element 520-2B, and so on such that a tracking line 508-18 electrically connects a sensor line 18 (i.e., X18) to a connection forming element 520-18B. "520-XA" and "520-XB," where X is a number (e.g., 0, 2 . . . 18), are used in this discussion to denote that such connection forming elements are associated with a same sensor line. In various embodiments, connection forming elements denoted as "A" and "B" may be different structures or a same structure, as discussed herein.

In the specific example depicted by FIG. 5, electrical connections of routing connectors 514 are respectively electrically connected to tracking lines 506 at locations along at least a portion of a first periphery 516 of inactive sensor region 504 (which first periphery 516 of inactive sensor region 504 at least partially coincides with a periphery of touch sensor 500).

In some embodiments, a resistance reducing connection may be used to electrically connect one or more of sense lines and drive lines to inputs or outputs of a touch controller. Using a case of a drive line, a first end of the drive line and the other (second) end of the drive line may be electrically connected to a same connection forming element 520 by respective routing connectors, tracking lines, or combinations thereof.

Respective first ends of respective drive lines X0 to X18 located substantially at first periphery 516 of inactive sensor region 504 are electrically connected to respective connection forming elements 520-0A to 520-18A by tracking lines 506-0 to 506-18.

Respective drive lines X0 to X18 may include, or a portion thereof may be, routing connectors 514-0 to 514-18, which extend from respective first ends of portions of drive lines X0 to X18 located substantially at first periphery 522 of active sensor region 502 to first periphery 516 of inactive sensor region 504, where they are electrically connected to tracking lines 506-0 to 506-18.

Respective other (second) ends of respective drive lines X0 to X18 located substantially at a second periphery 518 of active sensor region 502 (second periphery 518 at least partially coincides with a second periphery of touch sensor 500) are electrically connected to respective connection forming elements 520-0B to 520-18B by respective tracking lines 508-0 to 508-18. By way of non-limiting example, tracking lines 506 and 508 may be or include a conductive material such as silver or copper traces.

Embodiments of touch sensors using routing connections for single connections to connection forming elements, resistance reducing connectors to connection forming elements, and equivalents thereof are all within the scope of this disclosure.

Depending on design factors such as dimensions and resolution, without limitation, in some cases it is specifically contemplated that there may not be enough available conductors (or enough contiguous available conductors) in an inactive sensor region to form routing connectors 514 from all drive lines to a single periphery of a touch sensor 500, for example, to first periphery 516 of inactive sensor region 504 as depicted by FIG. 5. Moreover, in some cases it is specifically contemplated that there may be design reasons to form routing connectors at a periphery of more than one peripheries of a touch sensor 500 (e.g., to two, three, or more peripheries of a touch sensor, without limitation), such as to accommodate space on a board, to accommodate a shape of a board, or other factors about a device that might incorporate a touch sensor 500.

Figure 6:
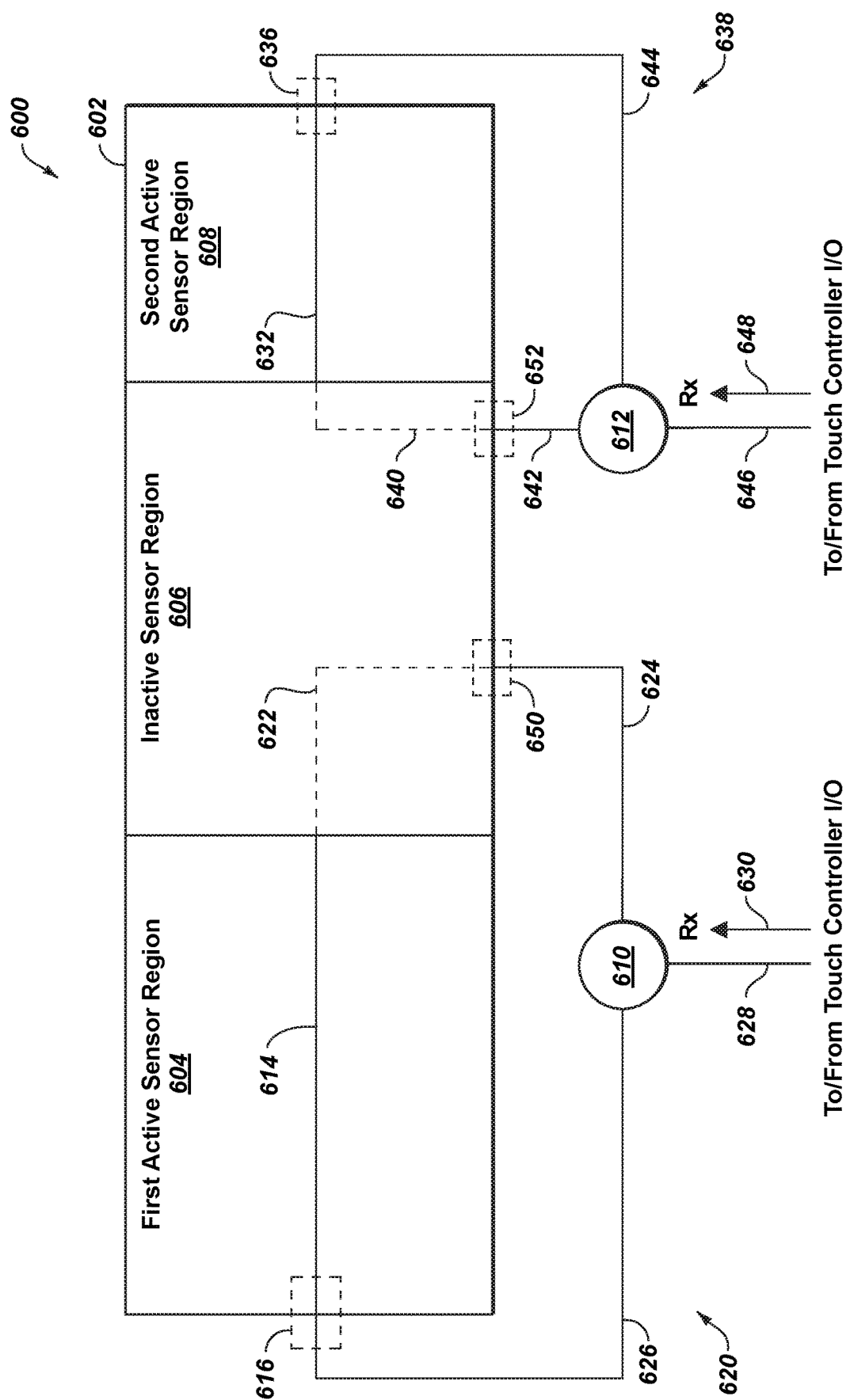
FIG. 6 is a schematic of a region of a touch sensor including an inactive sensor region and active sensor regions in accordance with one or more embodiments.

FIG. 6 is a schematic diagram of a touch sensor system 600, in accordance with one or more embodiments. Touch sensor system 600 includes a sensor region 602 that includes a first active sensor region 604 laterally spaced from a second active sensor region 608, and an inactive sensor region 606 interposed between first active sensor region 604 and second active sensor region 608.

Touch sensor system 600 includes a first resistance reducing connection 620 electrically connecting drive line 614 to line 628, and includes a second resistance reducing connection 638 electrically connecting drive line 632 to line 646.

In the case of first resistance reducing connection 620, first end 616 of drive line 614 is electrically connected to first connection forming element 610 by line 626, and a second end 650 of drive line 614 (and more specifically a second end 650 of a portion 622 of drive line 614, the portion 622 formed in inactive sensor region 606) is electrically connected to first connection forming element 610 by line 624. Thus, first resistance reducing connection 620 may be understood to include lines 624 and 626.

In the case of second connection forming element 612, first end 636 of drive line 632 is electrically connected to second connection forming element 612 via line 644, and a second end 652 of drive line 632 (and more specifically a second end 652 of a portion 640 of drive line 632, the portion 640 formed in inactive sensor region 606) is electrically connected to second connection forming element 612 via line 642. Thus, second resistance reducing connection 638 may be understood to include lines 642 and 644.

By way of non-limiting example, portions 622 and 640 may be or include one or more routing connectors such as routing connectors 514 of FIG. 5. By way of non-limiting example, lines 624, 626, 642 and 644 may be, or include, one or more tracking lines such as 506 and 508 of FIG. 5.

First and second connection forming elements 610 and 612 may be electrically connected to an output of a touch controller (not shown) by lines 628 and 646, respectively. Lines 628 and 646 may be, as non-limiting examples, electrical connections formed on a printed circuit board, a flex circuit, a wire, or combinations thereof.

By way of non-limiting example, during a contemplated operation of touch sensor system 600 a line resistance Rx observable at an output of a touch controller (not shown) electrically connected to first resistance reducing connection 620 by line 628 (or second resistance reducing connection 638 by line 646) when transmitting first drive signal 630 (or second drive signal 648) is lower in the arrangement depicted by FIG. 6 than, as a nonlimiting example, a line resistance Rx observable at an output of a touch controller electrically connected to a single end (e.g., if by first end 616 or second end 650, but not both) of drive line 614.

Notably, first active sensor region 604 is depicted with larger dimensions than second active sensor region 608, and indeed respective regions (active or inactive) of a touch sensor may have the same or different dimensions.

Touch sensor system 600 may include additional sensor lines and connection forming elements, as well as additional resistance reducing connectors electrically connecting the additional sensor lines to the additional connection forming elements, then are depicted by FIG. 6.

It is specifically contemplated that in some instances the number of X lines in an active sensor region or group of active sensor regions may exceed a number of available Y lines in an inactive sensor region and vice versa. In such cases, resistance reducing connectors may be formed for X-lines of fewer than all of the active sensor regions (or touch screens more generally). Additionally or alternatively, resistance reducing connectors may be formed for fewer than all of the X-lines of an active sensor region. Additionally or alternatively, some tracking lines (or tracking layers) may be added as desired to form resistance reducing connectors as discussed herein.

Any suitable arrangement of electrically connected connection elements may be used to form resistance reducing connections 620 and 638 and thereby electrically connect connection forming elements 610 and 612 with respective drive lines 614/632. FIGS. 12A, 12B, 12C and 12D depict a number of non-limiting embodiments of resistance reducing connection.

Figure 12A:
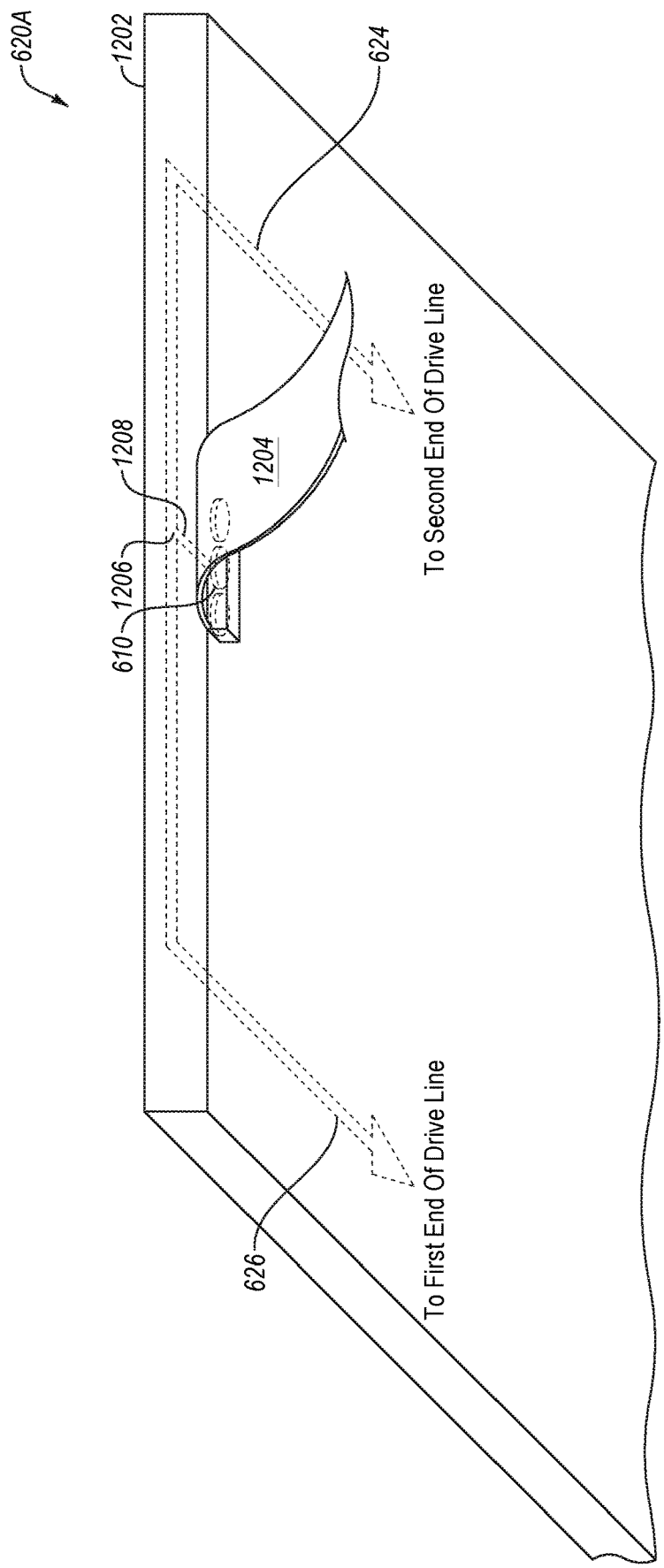
FIGS. 12A to 12D illustrate schematics of embodiments of resistance reducing connections.

FIG. 12A is a schematic diagram depicting a resistance reducing connection 620A in accordance with one or more embodiments. As depicted by FIG. 12A, in some embodiments of a touch display configuration, lines 626 and 624 may be formed in a transparent material 1202 of a display (e.g., a glass display cover, without limitation) or on an interior or exterior surface (with respect to the display) thereof. Lines 626 and 624 may be formed substantially on a second plane that is above a first plane where first connection forming element 610 interfaces the transparent material (roughly co-planar with a bottom surface of the transparent material). In some embodiments, first electrical contacts 1206 (e.g., a region of a continuous extension of conductive material forming respective lines 624 and 626, a pad or other structure, without limitation) may electrically connect lines 624 and 626, and second electrical contacts 1208 (e.g., a pad or other structure, without limitation) may electrically connect first electrical contacts 1206 to first connection forming element 610 located on flex circuit 1204.

Figure 12B:
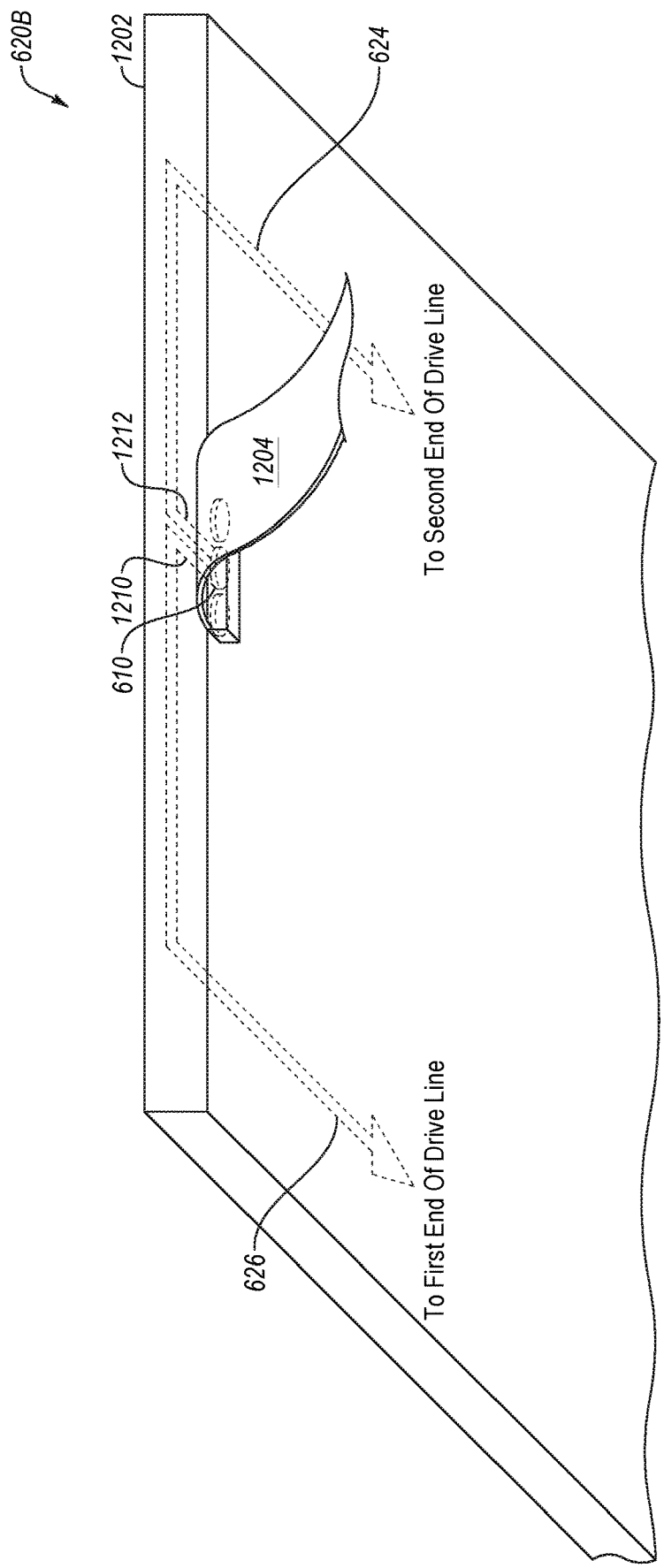

FIG. 12B is a schematic diagram depicting a resistance reducing connection 620B in accordance with one or more embodiments. As depicted by FIG. 12B, in some embodiments of a touch display configuration, lines 626 and 624 are formed in transparent material 1202 of a display and first electrical contacts 1210 and second electrical contacts 1212 individually electrically connect lines 626 and lines 624, respectively, to first connection forming element 610 on flex circuit 1204.

Figure 12C:
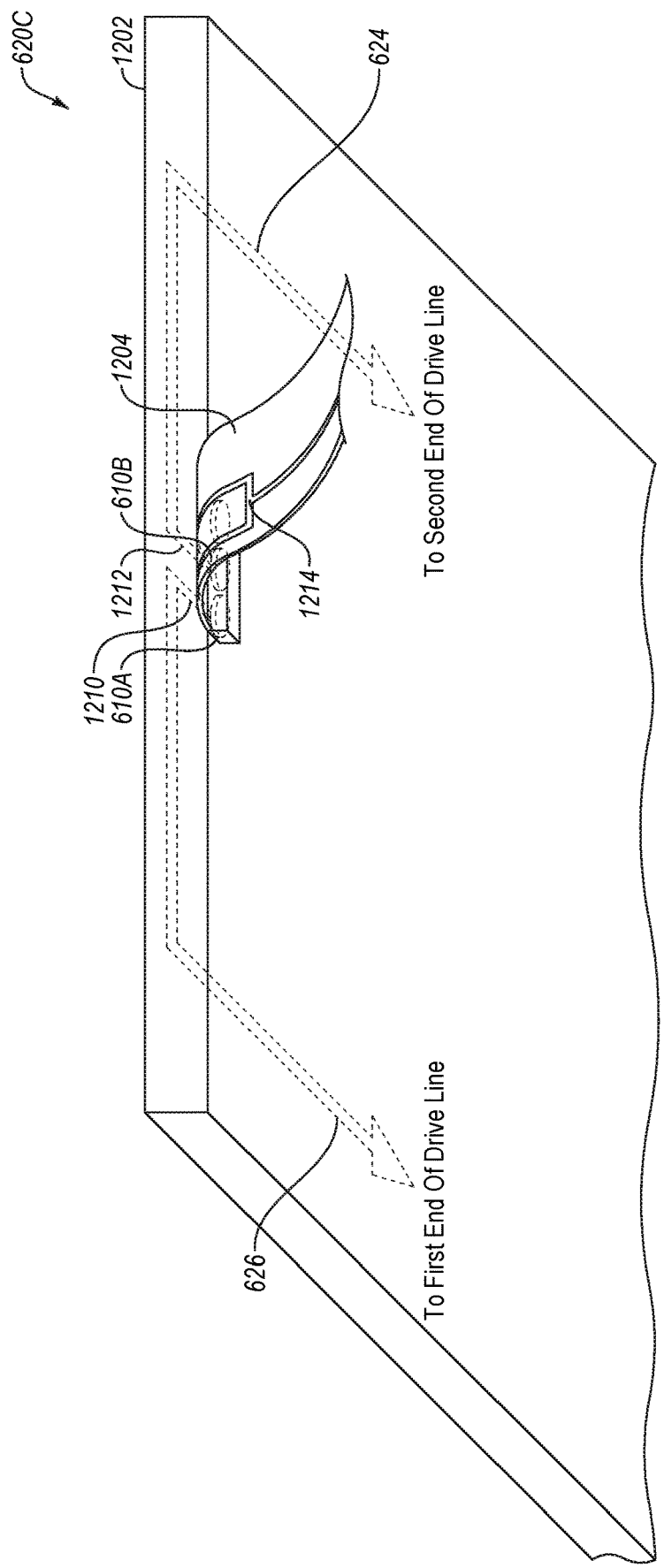

FIG. 12C is a schematic diagram depicting a resistance reducing connection 620C in accordance with one or more embodiments. As depicted by FIG. 12C, in some embodiments of a touch display configuration, first connection forming element 610 may include individual connection forming elements 610A and 610B, and lines 626 and lines 624 formed in transparent material 1202 may be electrically connected to connection forming elements 610A and 610B by first electrical contacts 1210 and second electrical contacts 1212, respectively. Connection forming elements 610A and 610B may be connected to a flex circuit 1204, and an electrical contact 1214 formed in the flex circuit 1204 may electrically connect connection forming elements 610A and 610B.

Figure 12D:
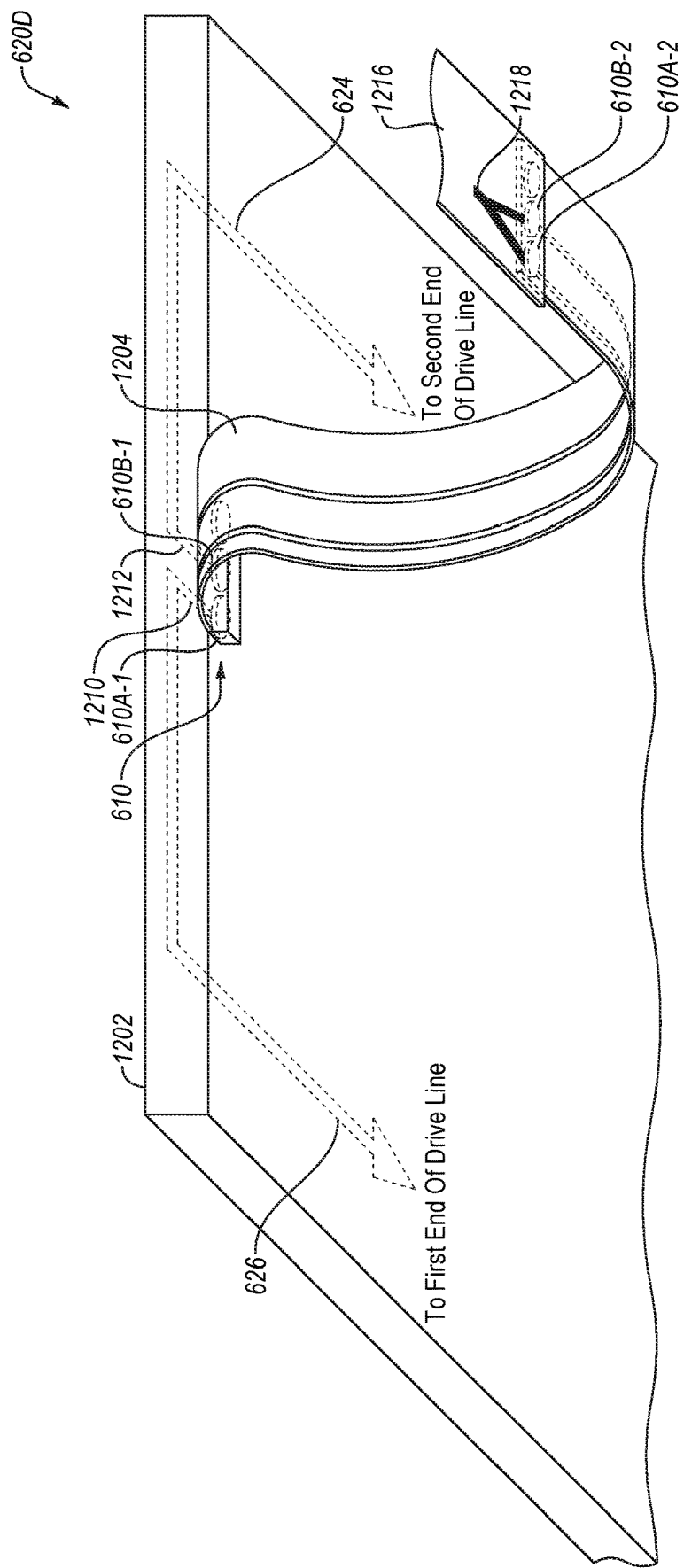

FIG. 12D is a schematic diagram depicting a resistance reducing connection 620D in accordance with one or more embodiments. As depicted by FIG. 12D, in some embodiments of a touch display configuration, lines 626 and 624 may be electrically connected to a pair of connection forming elements 610A-1 and 610B-1 by first electrical contacts 1210 and second electrical contacts 1212, respectively. The pair of connection forming elements 610A-1 and 610B-1 of flex circuit 1204 may be individually connected by respective wires to respective connection forming elements 610A-2 and 610B-2 located an opposite end of flex circuit 1204 that are electrically connected to a PCB 1216. PCB 1216 may include an electrical contact 1218 that electrically connects the pair of connection forming elements 610A-2 and 610B-2.

Figure 7:
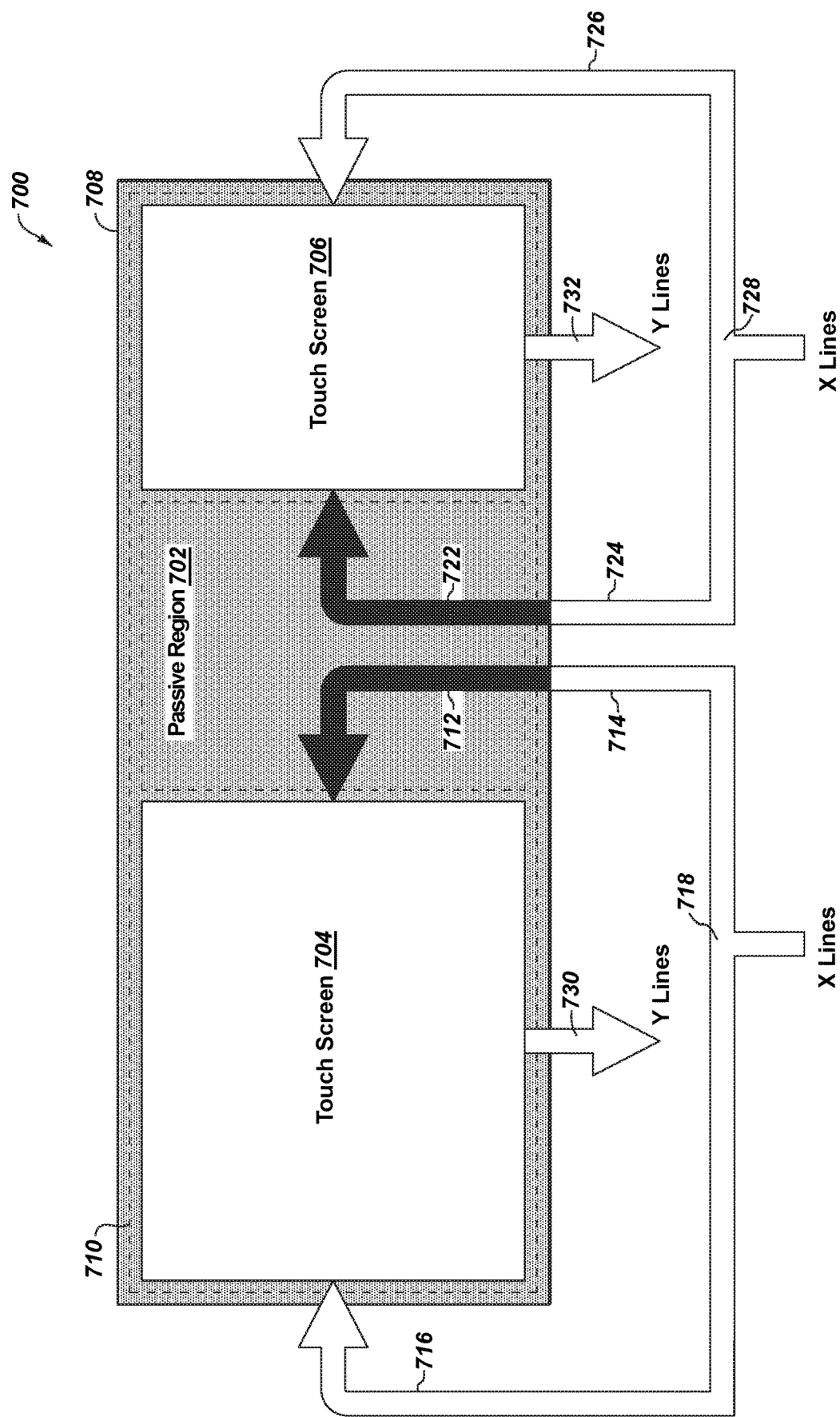
FIG. 7 is a schematic of a touch display including an inactive sensor region and active sensor regions in accordance with one or more embodiments.

FIG. 7 is a schematic diagram of a touch display 700 in accordance with one or more embodiments. Touch display 700 includes a touch sensor 710 that includes a passive region 702 (e.g., including an inactive sensor region), first touch screen 704 (e.g., including a first active sensor region) and a second touch screen 706 (e.g., including a second active sensor region), overlaying a display 708. Display 708 may be located under, and may extend continuously below, one or more first active sensor regions forming first touch screen 704, one or more second active sensor regions forming second touch screen 706, and one or more inactive sensor regions forming passive region 702 interposed laterally between the first active sensor region forming first touch screen 704 and the second active sensor region forming second touch screen 706.

First resistance reducing connector 718 may be understood to include first electrical connector 716 and second electrical connector 714. Second resistance reducing connector 728 may be understood to include first electrical connector 726 and second electrical connector 724.

Touch display 700 includes first resistance reducing connector 718 and second resistance reducing connector 728 for electrically connecting sensor lines (here X lines) of first touch screen 704 and second touch screen 706, respectively, to touch controller I/O (not shown), and further includes single connection 730 and single connection 732 for electrically connecting sensor lines (here Y lines) of first touch screen 704 and second touch screen 706, respectively, to touch controller I/O (not shown).

First and second routing connectors 712 and 722 of the first and second resistance reducing connectors 718 and 728, respectively, are formed in passive region 702 (e.g., in accordance with routing connectors 514 of FIG. 5, without limitation) and may extend over a portion of display 708, including without limitation, extending over a portion of a display surface of display 708.

First electrical connectors 716 and 726 of the first and second resistance reducing connectors 718 and 728, respectively, are generally located external to touch sensor 710 and respectively electrically connect to first touch screen 704 and second touch screen 706, respectively, at or near a periphery of display 708 and a periphery of respective first and second touch screens 704 and 706. Second t electrical connectors 714 and 724 of first and second resistance reducing connectors 718 and 728, respectively, are located external to touch sensor 710, and respectively electrically connect to first and second routing connectors 712 and 722 at or near a periphery of display 708 and a periphery of passive region 702.

First electrical connectors 716 and 726 and/or second electrical connectors 714 and 724 may extend over portions of display 708, though will typically extend only minimally (i.e., without obscuring) over a displaying surface of display 708. In some cases, a border (e.g., a portion of a housing for a touch display 700, without limitation) may be positioned over (i.e., to obscure) first electrical connectors 716 and 726 and/or second electrical connectors 714 and 724, including but not limited to positioned over portions of respective such first and/or second electrical connectors that extend over portions of display 708.

In the specific example depicted by FIG. 7, touch display 700 includes first and second resistance reducing connectors 718 and 728 for electrically connecting X lines of touch screen 704 and touch screen 706, respectively, to touch controller I/O. Touch display 700 further includes single connections 730 and 732 for connecting Y lines of touch screen 704 and touch screen 706, respectively, to touch controller I/O. In one or more embodiments, each of X lines and Y lines may be drive lines, sense lines, or a combination of the same.

Notably, from the perspective of a touch controller, resistance reducing connectors and single connections in accordance with disclosed embodiments may form part of drive and sense electrodes, as the case may be.

Figure 11:
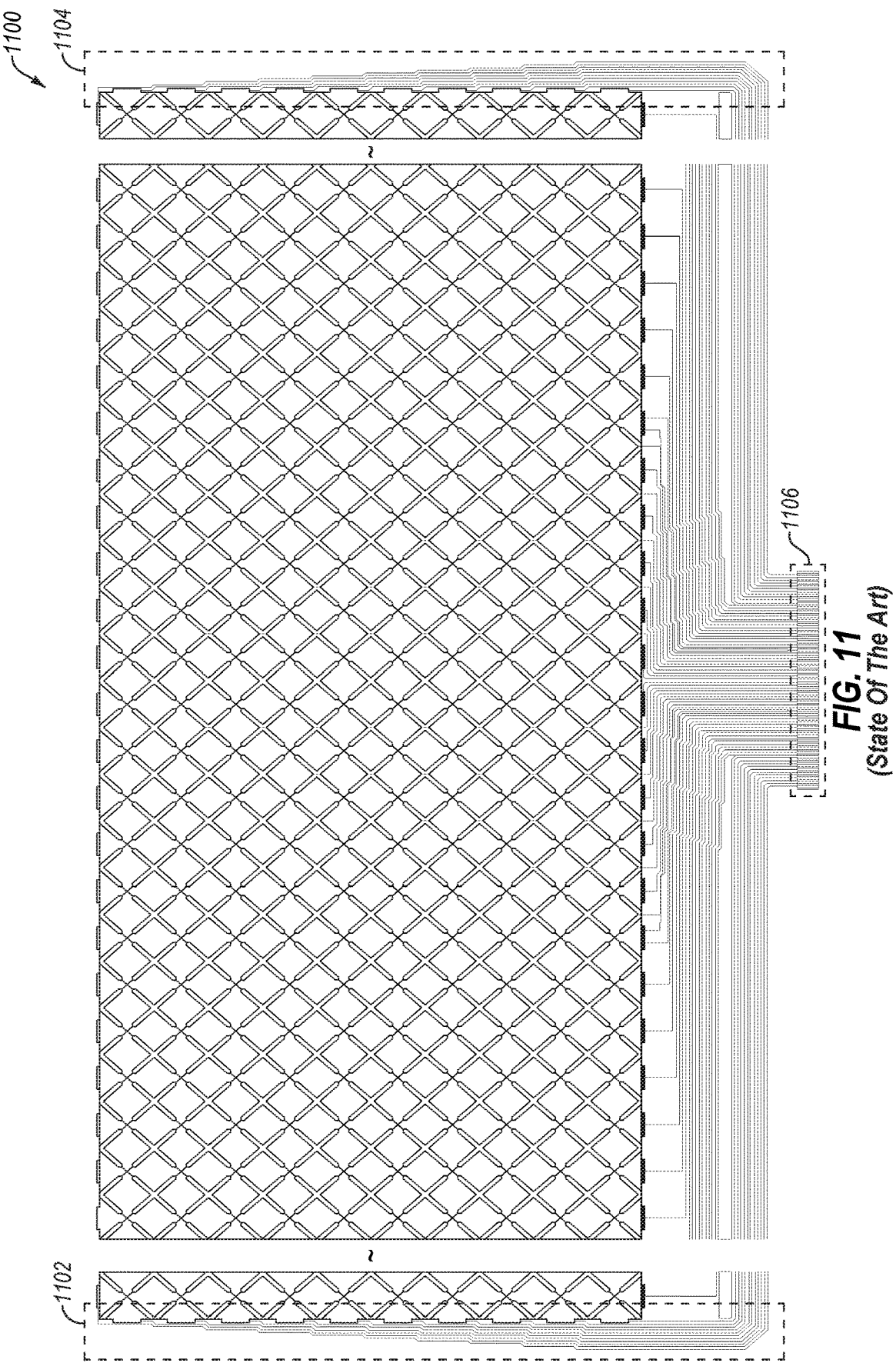
FIG. 11 illustrates a schematic of a touch screen with tracking lines in accordance with the state of the art.

Some embodiments relate, generally, to a borderless or near borderless touch display. As used herein, "borderless touch display" means that touch electrodes end at a border of a display. As used herein, "near borderless touch display" means that touch electrodes end at a border of at least one side of a display. To facilitate such an arrangement in general, at least some external electrical connections (e.g., tracking lines, without limitation) that might otherwise overlay a border region at a periphery of a display when using a routing scheme, such as depicted by FIG. 11 and discussed below, may be replaced by routing connectors formed in one or more inactive sensor regions of a touch sensor as further discussed herein.

Figure 8:
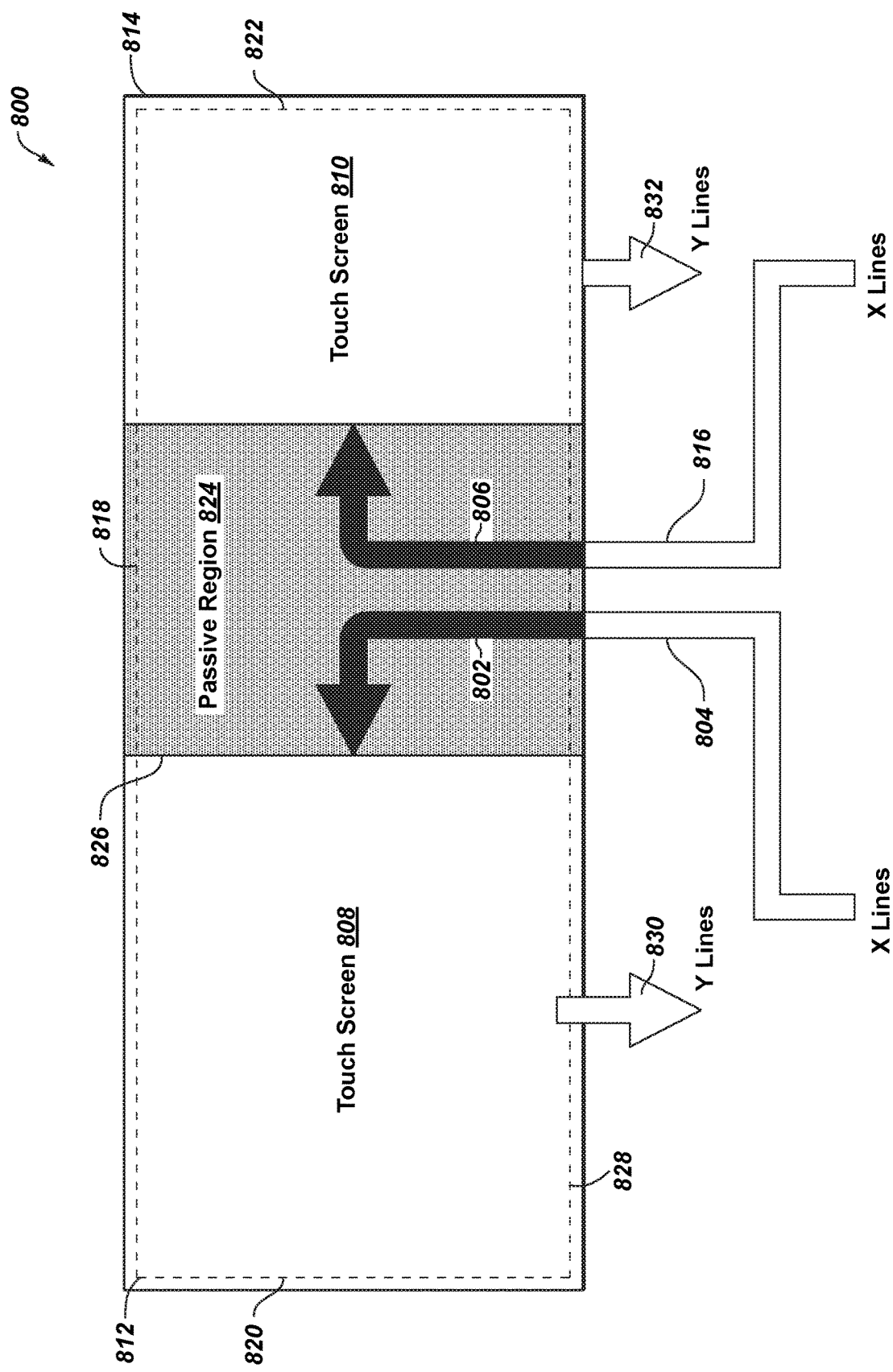
FIG. 8 is a schematic of a touch display including an inactive sensor region and active sensor region in accordance with one or more embodiments.

FIG. 8 is a schematic diagram of a touch display 800, in accordance with one or more embodiments. Touch display 800 includes a touch sensor 812 overlaying a display 814. Touch sensor 812 includes first touch screen 808 (e.g., including a first active sensor region) laterally spaced from a second touch screen 810 (e.g., including a second active sensor region) by a passive region 824 (e.g., including an inactive sensor region 826) interposed between first touch screen 808 and second touch screen 810. First routing connectors 802 form at least a portion of touch electrodes of first touch screen 808, and second routing connectors 806 form at least a portion of touch electrodes of second touch screen 810. First routing connectors 802 and second routing connectors 806 may be formed, as a non-limiting example, in accordance with routing connectors 514 of FIG. 5, without limitation. First and second routing connectors 802 and 806 may extend over a portion of display 814 which may also include a portion of a displaying surface of display 814.

Touch display 800 further includes first and second electrical connectors 804 and 816 which are electrically connected to touch sensor 812 and more specifically through inactive sensor region corresponding to passive region 824 by way of first and second routing connectors 802, 806, respectively, by a connection at or near a shared border of display 814 and touch sensor 812. First and second electrical connectors 804 and 816 may electrically connect touch electrodes (here X electrodes) of first touch screen 808 and second touch screen 810, respectively, to elements external to touch display 800 (e.g., to a touch controller, without limitation).

Touch display 800 further includes third and fourth electrical connectors 830 and 832 which electrically connect to touch sensor 812 (and more specifically to active sensor regions corresponding to first touch screen 808 and second touch screen 810, respectively) at or near the shared border of display 814 and touch sensor 812. Third and fourth electrical connectors 830 and 832 may electrically connect touch electrodes (here Y electrodes) of first touch screen 808 and second touch screen 810, respectively, to elements external to touch display 800 (e.g., a touch controller, without limitation).

As a non-limiting example, first, second, third and fourth electrical connectors 804, 816, 830 and 832 may include one or more electrical connector elements such as wires, tracking lines, connection forming elements (e.g., bond pads), flex circuits, conducting lines of a PCB, portions thereof, and combinations thereof. As non-limiting examples, first electrical connector 804 and second electrical connector 816 may be formed of the same or different connection elements or the same or different selection of connection elements.

Using first touch screen 808 for discussion purposes, first electrical connectors 804 may be configured to route drive signals or sense signals to or from first touch screen 808. In the specific example depicted by FIG. 8, first electrical connectors 804 are configured to route drive signals to drive electrodes of touch display 800. More specifically, first electrical connectors 804 are configured to route drive signals to first routing connectors 802 of drive electrodes of first touch screen 808, which are in turn configured to route drive signals to first touch screen 808.

First and second touch screens 808 and 810, and more specifically, touch electrodes of first and second touch screens 808 and 810, are electrically connected to first electrical connector 804, second electrical connector 816, third electrical connector 830, and fourth electrical connector 832 at connection locations substantially along a periphery 828 of touch sensor 812. More specifically, third electrical connector 830 and fourth electrical connector 832 are electrically connected to touch electrodes of first touch screen 808 and second touch screen 810, respectively, at connection locations substantially along portions of periphery 828 shared with first touch screen 808 and second touch screen 810, respectively. First electrical connectors 804 and second electrical connectors 816 are electrically to touch electrodes of first touch screen 808 and second touch screen 810, respectively, at connection locations substantially along a portion of periphery 828 shared with passive region 824.

Notably, a periphery of first touch screen 808 and second touch screen 810 at other sides (e.g., in the case of first touch screen 808, a periphery 820 at a left side and a periphery 818 at a top side; and in the case of second touch screen 810 a periphery 822 at a right side and periphery 828 at a top side; without limitation) are free of routing connectors and external electrical connectors. Moreover, a periphery of touch sensor 812 is free of external electrical connectors along peripheries of three sides, in the specific example depicted by FIG. 8, a top side, a left side, and a right side.

A displaying surface of display 814 may extend all the way to a periphery 820 of the left side of first touch screen 808, and to a periphery 818 of a top side of first touch screen 808, without being obscured by electrical connections, without limitation. A same or different displaying surface of display 814 may similarly extend all the way to periphery 822 of a right side of second touch screen 810, and to a periphery 818 of a top side of second touch screen 810 without being obscured by electrical connections.

In various embodiments, a periphery of display 814 (and a displaying surface thereof) is commensurate with a periphery defined by peripheries 818, 820 and 822 at three sides of touch sensor 812, and is not obscured by tracking lines or other electrical connections that might otherwise be covered/obscured by a bezel or other material of a border. Touch display 800 may be understood to be a borderless touch display (i.e., no border/bezel, border/bezel reduced, or border/bezel minimal), and may be used, as non-limiting examples, in so called standard-screen and wide-screen (e.g., standard aspect ratio and wide-aspect ratio, without limitation) applications.

While displays in accordance with disclosed embodiments, such as display 708 and 814, without limitation, may be described herein as a single display, the disclosure is not so limited. Displays 708 and 814 may be a single display with regions that may be interacted with via touch screens 704/706 or 808/810, and a region that is solely for viewing commensurate with passive regions 702 or 824. Alternatively, a region of display 708 or 814 that is commensurate with passive region 702 or 824 may be covered (e.g., by a housing, without limitation) and not used at all.

By way of another non-limiting example, displays 708 and 814 may include a number of individual displays that share a common touch sensor (e.g., touch sensor 710 or 812). As a non-limiting example, display 708 may include a display covered by first touch screen 704 and a display covered by second touch screen 706. As another non-limiting example, display 708 may include a display covered by first touch screen 704, a display covered by second touch screen 706, and a display covered by passive region 702. A person having ordinary skill in the art will appreciate that any of a variety of arrangements may be chosen to suit a variety of applications and environments.

Figure 9:
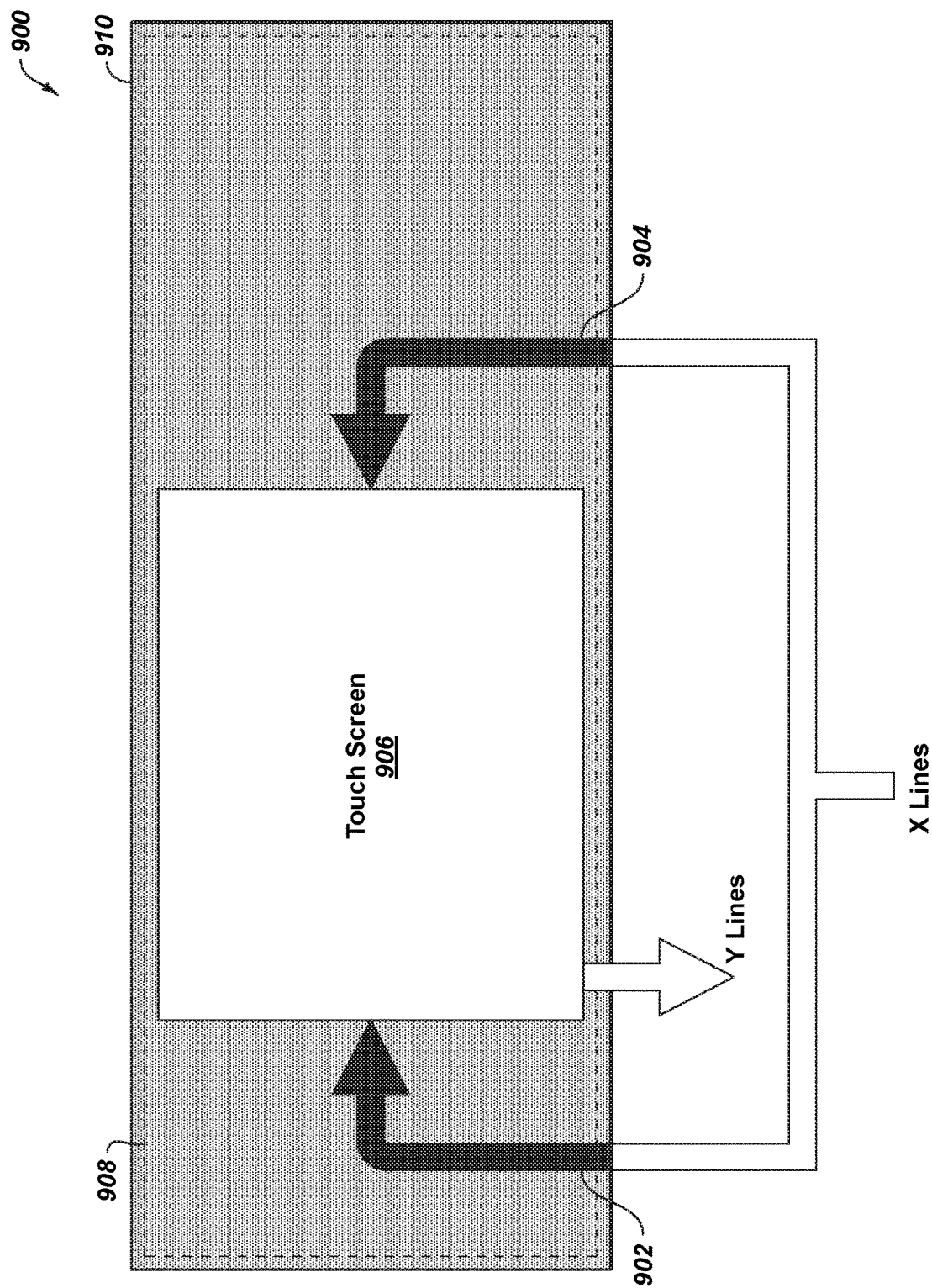
FIG. 9 is a schematic of a touch display including an inactive sensor region on two sides of an active sensor region in accordance with one or more embodiments.

FIG. 9 is a schematic diagram of a touch display 900 including first routing connectors 902 and second routing connectors 904 of a touch screen 906, where the first routing connectors 902 and second routing connectors 904 are formed, at least in part, using inactive sensor regions of touch sensor 908. In one embodiment, first and second routing connectors 902 and 904 are directly electrically connected to opposing ends of sensor lines (not shown) of touch screen 906 at first and second sides of touch screen 906. In another embodiment, at least one of first and second routing connectors 902 and 904 are indirectly electrically connected to opposing ends of sensor lines (not shown) of touch screen 906 at first and second sides of touch screen 906.

In the specific example depicted by FIG. 9, an area of a touch sensor 908 is greater than an area of touch screen 906, and an area of display 910 is greater than the area of touch screen 906 and touch sensor 908 more generally. Touch screen 906 substantially corresponds to an area of an active sensor region of touch sensor 908, and the remainder of the area of touch sensor 908 are inactive sensor regions. As discussed herein, touch sensor 908 is transparent as are first and second routing connectors 902 and 904 formed in the inactive sensor regions. So, a portion of touch display 900 may be touch sensitive and include a displaying surface (i.e., touch screen 906), and a portion of touch display 900 may be passive (i.e., not touch sensitive) and may include a displaying surface.

Referring back to FIGS. 7 and 8, in FIG. 7 a portion of touch display 700 may be touch sensitive and include a displaying surface (i.e., a portion corresponding to first and second active sensor regions of first touch screen 704 and second touch screen 706) and a portion of touch display 700 may be passive and include a displaying surface (i.e., a portion corresponding to passive region 702). In FIG. 8, a portion of touch display 800 may be touch sensitive and include a displaying surface (i.e., a portion corresponding to first and second active sensor regions of first touch screen 808 and second touch screen 810, respectively) and a portion of touch display 800 may be passive and include a displaying surface (i.e., a portion corresponding to passive region 824).

As discussed herein, a touch display in accordance with one or more embodiments may be arranged such that substantially all external connections with touch electrodes are grouped on fewer than all sides of the touch display. By way of non-limiting example, disclosed embodiments may provide flexibility in designing touch displays by enabling grouping connections with touch electrodes at a variety of locations along a periphery of a touch display.

While FIGS. 7, 8 and 9 depict specific non-limiting examples of touch displays where touch screens overlay at least portions of displaying surfaces of a display, other arrangements are within the scope of this disclosure. In some embodiments, touch screens may be formed in a touch pad or a set of capacitive buttons, which, as a non-limiting example, are usable to interact with a graphical user interface, a system, a sub-system, a device, an appliance, or any combination or sub-combination thereof.

Figure 10:
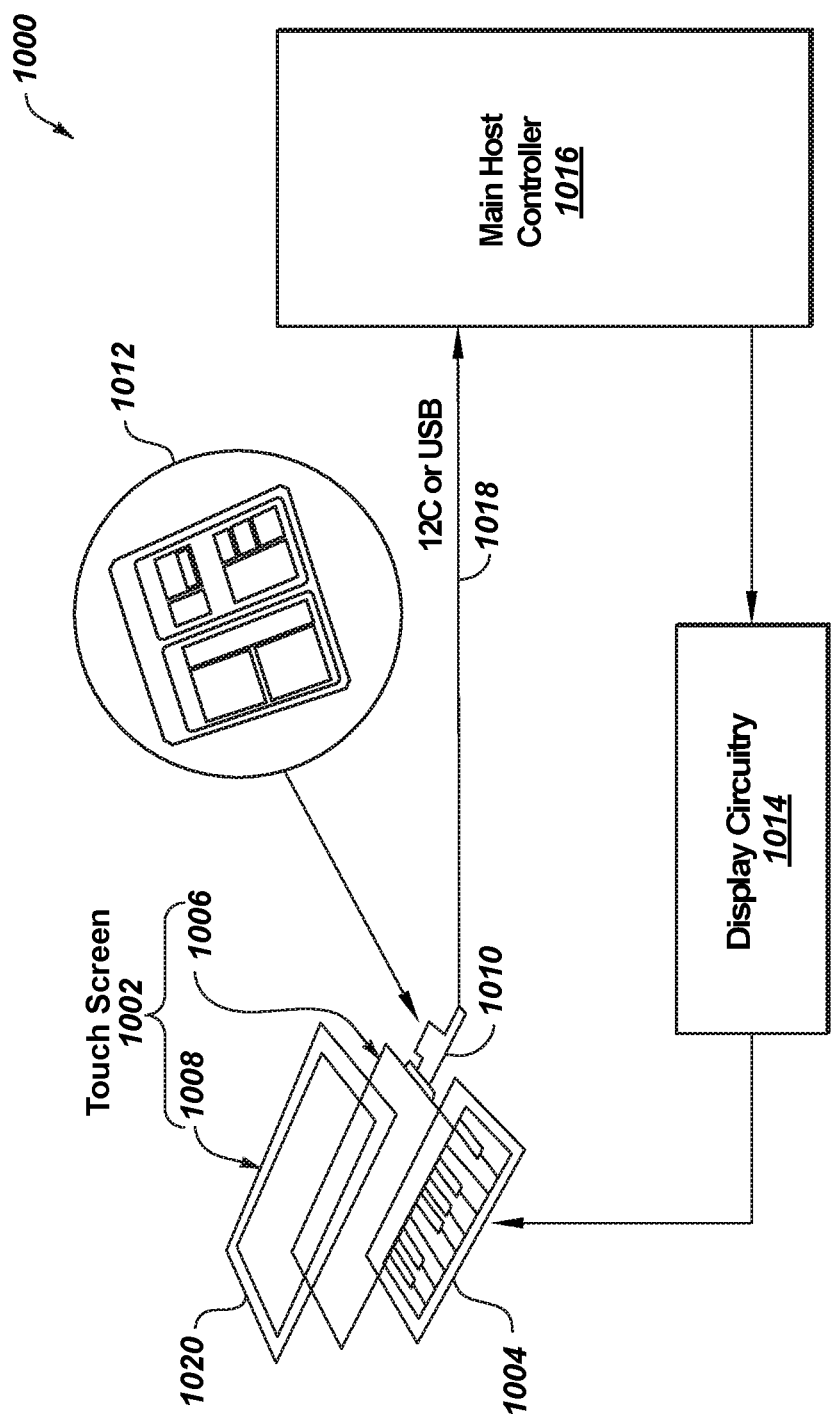
FIG. 10 illustrates a schematic of a touch display that includes a touch sensing system in accordance with one or more embodiments.

FIG. 10 is a schematic diagram depicting a stack up of a touch display system 1000 that includes a touch sensor system, in accordance with one or more embodiments. For example, touch display system 1000 may include touch screen 1002 including display 1004, touch sensor 1006 supported on display 1004, and front panel 1008 supported on touch sensor 1006. Display 1004 and touch sensor 1006 may be formed in accordance with the techniques described previously in accordance with FIG. 1 through FIG. 9. As depicted by FIG. 10, front panel 1008 has a limited border 1020, and in other embodiments may lack a border (e.g., a bezel), or may have borders of between 25% and 75% (e.g., 50%) smaller than some conventional borders known to the inventors of this disclosure, at least on three sides of front panel 1008.

Connector 1010 (e.g., a printed circuit board, a flexi cable, a flex circuit) configured to operatively connect touch screen 1002 to other devices and/or power may be located on the remaining side of touch screen 1002. In some embodiments, touch IC 1012 may be positioned and/or supported, as non-limiting examples, on connector 1010 (e.g., on a flex or on a host printed circuit board, without limitation). Touch IC 1012 may be configured to send drive signals to, and receive sensed signals from, touch sensor 1006, and may optionally perform some or all processing of the sensed signals locally. Connector 1010 may connect the touch screen 1002, touch sensor 1006 and touch IC 1012 to a main host controller 1016 for touch display system 1000. Connector 1010 may be configured to carry communication signals, including without limitation touch information (e.g., x and y coordinates, without limitation) sent by touch IC 1012 via communication interface 1018 (e.g., Inter-Integrated Circuit (I2C), Serial Peripheral Interface (SPI), or Universal Serial Bus (USB)) to main host controller 1016. Main host controller 1016 is configured to control display 1004 via display circuitry 1014.

In the case of some conventional touch sensor known to the inventors of this disclosure, tracking lines may form at least part of an electrical connection between a sensor line (e.g., a drive line or a sense line) and e.g., a bond pad. Tracking lines are typically implemented by a metal connection that is routed along portion of a periphery of a touch sensor to connection forming elements such as bond pads.

FIG. 11 is a schematic diagram of a sensor 1100 including tracking lines, in accordance with the state of the art as known to the inventors of this disclosure. Here tracking lines 1102 and 1104 (in contrast to routing connectors in accordance with one or more embodiments) are formed, starting at a left side and a right side of sensor 1100, respectively, along a portion of a periphery (i.e., a periphery portion) of sensor 1100 to connection forming elements 1106 located at a bottom of sensor 1100. Tracking lines 1102 and 1104 formed along a periphery of sensor 1100 are sometimes referred to as "edge tracking lines" or just "edge tracking" of a sensor.

Notably, from the perspective of a touch screen, tracking lines may be seen as electrodes for forming a connection with bond pads, and vice versa.

Tracking lines may sometimes be visible to the human eye, and so in the case of a touch display, an extent of a displaying surface of the touch display may be limited by a portion of a touch sensor that is transparent and that does not include any tracking lines. In some cases, an opaque material or portion of a housing supporting a touch display may be used to cover or otherwise hide portions of a touch sensor including tracking lines from view. This may result in the appearance of a border around a touch display with a width substantially equal to a width of the tracking lines routed along a periphery-portion of a touch sensor.

In contrast with such conventional touch sensors known to inventors of this disclosure, touch sensors in accordance with some embodiments of this disclosure may use routing connectors in inactive sensor regions of a touch sensor thereby eliminating or reducing the amount of tracking lines routed along a border of a touch display. By using routing connectors in inactive sensor region of a touch sensor to replace tracking lines, bordering to cover tracking lines may be reduced or eliminated.

By relocating at least some tracking lines from a periphery of a touch sensor to one or more inactive sensor regions within a boundary of a touch sensor, the charge and response time of the touch sensor may be reduced because the total distance (e.g., length of a line forming a signal path) from an active sensor region to an output of a touch controller may be shortened when compared to techniques that route those lines to, and around/along, a periphery of a touch sensor.

By relocating at least some tracking lines from a periphery to an inactive sensor region within a touch sensor itself may enable the use of reduced borders, or borderless designs, because there may be a reduced (or eliminated) need to conceal the tracking lines at the periphery.

Signal routing techniques in accordance with this disclosure may enable deployment of touch sensors without some or all of the charge time disadvantages of conventional touch sensors described herein, and by way of non-limiting example, deployed in in wider touch sensors and touch screens than practicable using some conventional signal routing techniques known to the inventors of this disclosure (e.g., not practical using single connection techniques because the charge time was too slow, without limitation). As non-limiting examples, signal routing techniques in accordance with this disclosure may enable deployment of touch sensors in touch screens that are about 5 feet wide or greater (e.g., between about 5 feet and about 30 feet, between about 6 feet and about 26 feet, between about 10 feet and about 20 feet), by utilizing resistance reducing connectors and, more specifically, resistance reducing connectors via inactive sensor regions.

Any characterization in this description of something as "typical," "conventional," "known," or the like does not necessarily mean that it is disclosed in the prior art or that the discussed aspects are appreciated in the prior art. Nor does it necessarily mean that, in the relevant field, it is widely known, well-understood, or routinely used.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of embodiments include:

Embodiment 1: A touch sensor, comprising: a support structure; a first connection forming element positioned on a surface of the support structure; and a sensor region comprising: a first active sensor region; a first inactive sensor region; and a first routing connector of the first inactive sensor region, the first routing connector electrically connected to the first active sensor region and electrically connected to the first connection forming element.

Embodiment 2: The touch according to Embodiment 1, wherein the first active sensor region comprises active sensor nodes, and wherein the first inactive sensor region comprises inactive sensor nodes.

Embodiment 3: The touch sensor according to any of Embodiments 1 and 2, wherein the first active sensor region comprises a sensor line.

Embodiment 4: The touch sensor according to any of Embodiments 1 through 3, wherein a first end of the sensor line is electrically connected to the first routing connector.

Embodiment 5: The touch sensor according to any of Embodiments 1 through 4, wherein a second end of the sensor line is electrically connected to a tracking line.

Embodiment 6: The touch sensor according to any of Embodiments 1 through 5, wherein a second end of the sensor line is directly electrically connected to a second routing connector of a second inactive sensor region.

Embodiment 7: The touch sensor according to any of Embodiments 1 through 6, wherein the sensor region comprises: first electrical conductors arranged in a first direction; and second electrical conductors arranged in a second direction, the second direction transverse to the first direction; each of the active sensor nodes comprising: two electrically connected first electrical conductors, and two electrically connected second electrical conductors; and each of the inactive sensor nodes comprising only one of: (i) two electrically connected first electrical conductors, or (ii) two electrically connected second electrical conductors.

Embodiment 8: The touch sensor according to any of Embodiments 1 through 7, wherein the first routing connector comprises at least one of the inactive sensor nodes.

Embodiment 9: The touch sensor according to any of Embodiments 1 through 8, wherein the first routing connector comprises a number of continuously electrically connected inactive sensor nodes.

Embodiment 10: The touch sensor according to any of Embodiments 1 through 9, further comprising: an electrical connector electrically connected to an end of the first routing connector, the end of the first routing connector located at a periphery of the first inactive sensor region, and electrically connected to the first connection forming element.

Embodiment 11: The touch sensor according to any of Embodiments 1 through 10, further comprising: one or more tracking lines arranged along at least a portion of a periphery of the first active sensor region; and wherein the one or more tracking lines are electrically are electrically connected to the first active sensor region and electrically connected to the first connection forming element.

Embodiment 12: The touch sensor according to any of Embodiments 1 through 11, wherein the sensor region comprises a second active sensor region spaced apart from the first active sensor region, and wherein the first inactive sensor region is interposed between the first active sensor region and the second active sensor region.

Embodiment 13: The touch sensor according to any of Embodiments 1 through 12, further comprising: a second routing connector of the first inactive sensor region; and a second connection forming element, wherein the second routing connector is electrically connected to the second active sensor region and electrically connected to a second connection forming element.

Embodiment 14: A touch sensing system, comprising: a touch sensor comprising: a support structure; a connection forming element positioned on a surface of the support structure; and a sensor region comprising: an active sensor region; an inactive sensor region; and a routing connector of the inactive sensor region, the routing connector electrically connected to the active sensor region and electrically connected to the connection forming element, and a touch controller, wherein an input or an output of the touch controller is electrically connected to the connection forming element.

Embodiment 15: The touch sensing system according to Embodiment 14, wherein the input or the output of the touch controller is electrically connected to the connection forming element by a flex circuit or a connector of a printed circuit board.

Embodiment 16: The touch sensing system according to any of Embodiments 14 and 15, wherein the input or the output of the touch controller is electrically connected to the connection forming element by a flex circuit and a printed circuit board.

Embodiment 17: A sensor region of a capacitive touch sensor, the sensor region comprising: first electrical conductors arranged in a first direction; second electrical conductors arranged in a second direction, the second direction transverse to the first direction; an active sensor node comprising: two electrically connected first electrical conductors, and two electrically connected second electrical conductors; and a first inactive sensor node comprising a group of electrically connected electrical conductors, the group of electrically connected electrical conductors comprising one and only one of: (i) two or more electrically connected first electrical conductors, or (ii) two or more electrically connected second electrical conductors.

Embodiment 18: The sensor region according to Embodiment 17, wherein a first one of the first electrical conductors is electrically connected to: a second one of the first electrical conductors; and a first one of the second electrical conductors, wherein the second one of the first electrical conductors and the first one of the second electrical conductors are within an inactive sensor region comprising the first inactive sensor node.

Embodiment 19: The sensor region according to any of Embodiments 17 and 18, further comprising a second inactive sensor node comprising a group of electrically-isolated electrical conductors, the group of electrically-isolated electrical conductors comprising a number of the first electrical conductors and a number of the second electrical conductors.

Embodiment 20: The sensor region according to any of Embodiments 17 through 19, wherein the sensor region is one of a number of sensor regions of the capacitive touch sensor.

Embodiment 21: A touch display, comprising: a display; and a touch sensor overlaid a displaying surface of the display, wherein a periphery of the touch sensor that is commensurate with a periphery of the displaying surface is free of tracking lines on a portion of the periphery of the touch sensor that is commensurate with three sides of the displaying surface.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one or more disclosed embodiments may be combined with features of one or more other disclosed embodiments while still being within the scope of this disclosure, as contemplated by the inventors.

What is claimed is:

1. A touch sensor, comprising:
   a support structure;
   a first connection forming element positioned on a surface of the support structure; and
   a sensor region comprising:
      a first active sensor region;
      a first inactive sensor region;
      a first routing connector of the first inactive sensor region, the first routing connector comprising a first number of continuously electrically connected inactive sensor nodes, the first routing connector electrically connected to the first active sensor region and electrically connected to the first connection forming element;
      a second active sensor region, the first inactive sensor region interposed between the first active sensor region and the second active sensor region; and
      a second routing connector of the first inactive sensor region, the second routing connector comprising a second number of continuously electrically connected inactive sensor nodes, the second routing connector electrically connected to the second active sensor region and electrically connected to the first connection forming element.

2. The touch sensor of claim 1, wherein the first active sensor region comprises active sensor nodes.

3. The touch sensor of claim 1, wherein the first active sensor region comprises a sensor line.

4. The touch sensor of claim 3, wherein a first end of the sensor line is electrically connected to the first routing connector.

5. The touch sensor of claim 4, wherein a second end of the sensor line is electrically connected to a tracking line.

6. The touch sensor of claim 4, wherein a second end of the sensor line is directly electrically connected to another routing connector of a second inactive sensor region.

7. The touch sensor of claim 2, wherein the sensor region comprises:
   first electrical conductors arranged in a first direction; and
   second electrical conductors arranged in a second direction, the second direction transverse to the first direction;
   each of the active sensor nodes comprising: two electrically connected first electrical conductors, and two electrically connected second electrical conductors; and
   each of the inactive sensor nodes comprising only one of: (i) two electrically connected first electrical conductors, or (ii) two electrically connected second electrical conductors.

8. The touch sensor of claim 1, further comprising:
   an electrical connector electrically connected to an end of the first routing connector, the end of the first routing connector located at a periphery of the first inactive sensor region, and electrically connected to the first connection forming element.

9. The touch sensor of claim 1, further comprising:
   one or more tracking lines arranged along at least a portion of a periphery of the first active sensor region; and
   wherein the one or more tracking lines are electrically connected to the first active sensor region and electrically connected to the first connection forming element.

10. A touch sensing system, comprising:
    a touch sensor comprising:
       a support structure;
       a connection forming element positioned on a surface of the support structure; and
       a sensor region comprising:
          a first active sensor region;
          a first inactive sensor region;
          a first routing connector of the first inactive sensor region, the first routing connector comprising a first number of continuously electrically connected inactive sensor nodes, the first routing connector electrically connected to the first active sensor region and electrically connected to the connection forming element;

a second active sensor region, the first inactive sensor region interposed between the first active sensor region and the second active sensor region; and a second routing connector of the first inactive sensor region, the second routing connector comprising a second number of continuously electrically connected inactive sensor nodes, the second routing connector electrically connected to the second active sensor region and electrically connected to the first connection forming element; and a touch controller, wherein an input or an output of the touch controller is electrically connected to the connection forming element.

11. The touch sensing system of claim 10, wherein the input or the output of the touch controller is electrically connected to the connection forming element by a flex circuit or a connector of a printed circuit board.

12. The touch sensing system of claim 11, wherein the input or the output of the touch controller is electrically connected to the connection forming element by a flex circuit and a printed circuit board.

13. A sensor region of a capacitive touch sensor, the sensor region comprising:

first electrical conductors arranged in a first direction;

second electrical conductors arranged in a second direction, the second direction transverse to the first direction;

a first active sensor node in a first, active sensor region, the first active sensor node comprising: two electrically connected first electrical conductors, and two electrically connected second electrical conductors;

a first inactive sensor node in a first inactive sensor region the first inactive sensor node comprising a group of electrically connected electrical conductors, the group of electrically connected electrical conductors comprising one and only one of: (i) two or more electrically connected first electrical conductors, or (ii) two or more electrically connected second electrical conductors;

a second active sensor node in a second active sensor region the first inactive sensor region interposed between the first active sensor region and the second active sensor region, the second active sensor node comprising: two electrically connected first electrical conductors, and two electrically connected second electrical conductors;

a first routing connector of the first inactive sensor region, the first routing connector comprising a first number of continuously electrically connected inactive sensor nodes the first routing connector electrically connected to the active sensor region and electrically connected to a connection forming element; and a second routing connector of the first inactive sensor region, the second routing connector comprising a second number of continuously electrically connected inactive sensor nodes, the second routing connector electrically connected to the second active sensor region and electrically connected to the first connection forming element.

14. The sensor region of claim 13, wherein a first one of the first electrical conductors is electrically connected to:

a second one of the first electrical conductors; and a first one of the second electrical conductors, wherein the second one of the first electrical conductors and the first one of the second electrical conductors are within the first inactive sensor region comprising the first inactive sensor node.

15. The sensor region of claim 13, further comprising a second inactive sensor node comprising a group of electrically-isolated electrical conductors, the group of electrically-isolated electrical conductors comprising another number of the first electrical conductors and another number of the second electrical conductors.

16. The sensor region of claim 13, wherein the sensor region is one of a number of sensor regions of the capacitive touch sensor.

* * * * *

UNITED STATES PATENT AND TRADEMARK OFFICE
CERTIFICATE OF CORRECTION

PATENT NO. : 11,301,080 B2
APPLICATION NO. : 16/948270
DATED : April 12, 2022
INVENTOR(S) : Rob Ann Beuker et al.

It is certified that error appears in the above-identified patent and that said Letters Patent is hereby corrected as shown below:

In the Claims

| | | | |
|---|---|---|---|
| Claim 13, | Column 27, | Line 29, | change "first, active" to --first active-- |
| Claim 13, | Column 27, | Line 33, | change "region" to --region,-- |
| Claim 13, | Column 28, | Line 2, | change "region" to --region,-- |
| Claim 13, | Column 28, | Line 11, | change "nodes" to --nodes,-- |

Signed and Sealed this
Twentieth Day of December, 2022

Katherine Kelly Vidal
*Director of the United States Patent and Trademark Office*